US009432164B2

(12) United States Patent
Chen et al.

(10) Patent No.: US 9,432,164 B2
(45) Date of Patent: Aug. 30, 2016

(54) METHOD AND APPARATUS FOR REFERENCE SIGNAL SEQUENCE MAPPING IN WIRELESS COMMUNICATION

(75) Inventors: Wanshi Chen, San Diego, CA (US); Peter Gaal, San Diego, CA (US); Juan Montojo, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 841 days.

(21) Appl. No.: 12/903,659

(22) Filed: Oct. 13, 2010

(65) Prior Publication Data

US 2011/0249767 A1    Oct. 13, 2011

Related U.S. Application Data

(60) Provisional application No. 61/251,939, filed on Oct. 15, 2009.

(51) Int. Cl.
| | | |
|---|---|---|
| H04B 7/212 | (2006.01) | |
| H04W 4/00 | (2009.01) | |
| H04B 7/208 | (2006.01) | |
| H04L 12/413 | (2006.01) | |
| H04L 5/00 | (2006.01) | |

(52) U.S. Cl.
CPC ........... *H04L 5/0051* (2013.01); *H04L 5/0023* (2013.01)

(58) Field of Classification Search
CPC ... H04W 72/04; H04L 5/0051; H04L 5/0023
USPC ........ 370/322, 329, 341, 348, 443; 455/345, 455/263, 326, 336, 442, 498
See application file for complete search history.

(56) References Cited

U.S. PATENT DOCUMENTS

| | | | |
|---|---|---|---|
| 5,887,262 | A | 3/1999 | Willhoff |
| 7,443,875 | B2 | 10/2008 | Okuyama |
| 7,734,979 | B1 | 6/2010 | Jones et al. |
| 8,369,429 | B2 | 2/2013 | Koo et al. |
| 8,634,362 | B2 | 1/2014 | Montojo et al. |
| 8,948,097 | B2 | 2/2015 | Chen et al. |
| 2002/0138721 | A1 | 9/2002 | Kwon et al. |
| 2002/0191562 | A1 | 12/2002 | Kumaki et al. |
| 2003/0169702 | A1 | 9/2003 | Ryu et al. |
| 2005/0018703 | A1 | 1/2005 | Blasco et al. |
| 2008/0285433 | A1* | 11/2008 | Akita et al. ................. 370/204 |

(Continued)

FOREIGN PATENT DOCUMENTS

| | | |
|---|---|---|
| CN | 1339888 A | 3/2002 |
| CN | 1618195 A | 5/2005 |

(Continued)

OTHER PUBLICATIONS

"UE-RS Patterns for ranks 5 to 8 of LTE-A", 3GPP TSG-RAN WG1 #58bis, R1-094212, Oct. 12-16, 2009, Miyazaki, Japan.

(Continued)

*Primary Examiner* — Abdelnabi Musa

(57) ABSTRACT

A wireless communication method implemented in a multi-user, multi-input multi-output MU-MIMO system is disclosed which includes forming one or more antenna port sets, wherein an antenna port set comprises two or more antenna ports and allocating transmission resources to a user equipment reference signal UE-RS, the allocating being based at least in part on an antenna port set index.

19 Claims, 15 Drawing Sheets

(56) References Cited

U.S. PATENT DOCUMENTS

| | | | |
|---|---|---|---|
| 2009/0036168 A1* | 2/2009 | Nawata et al. | 455/561 |
| 2009/0132675 A1 | 5/2009 | Horn et al. | |
| 2009/0136034 A1 | 5/2009 | Gaal et al. | |
| 2009/0238064 A1* | 9/2009 | Lee et al. | 370/208 |
| 2009/0268910 A1* | 10/2009 | Liu et al. | 380/268 |
| 2010/0041350 A1* | 2/2010 | Zhang et al. | 455/101 |
| 2010/0062783 A1 | 3/2010 | Luo et al. | |
| 2010/0195599 A1 | 8/2010 | Zhang et al. | |
| 2010/0238877 A1* | 9/2010 | Nam et al. | 370/329 |
| 2010/0272040 A1* | 10/2010 | Nam et al. | 370/329 |
| 2010/0304682 A1 | 12/2010 | Choi et al. | |
| 2011/0038330 A1 | 2/2011 | Luo et al. | |
| 2011/0077038 A1 | 3/2011 | Montojo et al. | |
| 2011/0085503 A1 | 4/2011 | Nam et al. | |
| 2011/0128872 A1* | 6/2011 | Lindoff | 370/252 |
| 2011/0194485 A1 | 8/2011 | Horneman et al. | |
| 2011/0205930 A1* | 8/2011 | Rahman | H04B 7/0417 370/328 |
| 2011/0216842 A1 | 9/2011 | Zhang et al. | |
| 2011/0228728 A1* | 9/2011 | Baligh | H04B 7/0669 370/328 |
| 2011/0235608 A1 | 9/2011 | Koo et al. | |
| 2011/0237267 A1 | 9/2011 | Chen et al. | |
| 2011/0243191 A1 | 10/2011 | Nakao et al. | |
| 2011/0305287 A1 | 12/2011 | Kwon et al. | |
| 2012/0033643 A1* | 2/2012 | Noh et al. | 370/335 |
| 2012/0113951 A1 | 5/2012 | Koo et al. | |
| 2012/0120842 A1* | 5/2012 | Kim et al. | 370/252 |
| 2012/0236741 A1 | 9/2012 | Xu et al. | |
| 2012/0329468 A1 | 12/2012 | Chmiel et al. | |
| 2013/0051371 A1 | 2/2013 | Ko et al. | |
| 2013/0336214 A1 | 12/2013 | Sayana et al. | |
| 2013/0343299 A1 | 12/2013 | Sayana et al. | |
| 2014/0036737 A1 | 2/2014 | Ekpenyong et al. | |
| 2014/0092829 A1 | 4/2014 | Han et al. | |
| 2015/0103807 A1 | 4/2015 | Montojo et al. | |

FOREIGN PATENT DOCUMENTS

| | | |
|---|---|---|
| CN | 101340228 A | 1/2009 |
| CN | 101355535 A | 1/2009 |
| EP | 2104295 A2 | 9/2009 |
| JP | 2012531082 A | 12/2012 |
| KR | 100759002 B1 | 9/2007 |
| TW | M335885 U | 7/2008 |
| TW | 200929944 A | 7/2009 |
| WO | 2009002251 A3 | 2/2009 |
| WO | 2008152612 A3 | 3/2009 |
| WO | 2009120791 A2 | 10/2009 |
| WO | 2010068011 A2 | 6/2010 |
| WO | 2010147419 A2 | 12/2010 |
| WO | 2011021154 A1 | 2/2011 |

OTHER PUBLICATIONS

"3rd Generation Partnership Project; Technical Specification Group Radio Access Network; Evolved Universal Terrestrial Radio Access (E-UTRA); Physical Channels and Modulation" (Release 8), 3GPP TS 36.211 V8.9.0, Dec. 2009.

"3rd Generation Partnership Project; Technical Specification Group Radio Access Network; Evolved Universal Terrestrial Radio Access (E-UTRA); Physical layer procedures", (Release 8), 3GPP TS 36.213 V8.8.0, Sep. 2009.

"UE-RS Patterns for Rank 3-4", 3GPP TSG-RAN WG1 #58bis, R1-094211, Oct. 12-16, 2009, Miyazaki, Japan.

3rd Generation Partnership Project; Technical Specification Group Radio Access Network; Evolved Universal Terrestrial Radio Access (E-UTRA); Physical Channels and Modulation (Release 8) 3GPP Standard; 3GPP TS 36.211, SRD Generation Partnership Project (3GPP), Mobile Competence Centre ; 650, Route Des Lucioles ; F-06921 Sophia-Antipolis Cedex ; France, No. V8.6.0, Mar. 1, 2009, pp. 1-83, XP050377538.

Ericsson: "A discussion on some technology components for LTE-Advanced", 3GPP Draft, R1-082024 {LTE-Advanced Technology Components}, 3rd Generation Partnership Project (3GPP), Mobile Competence Centre, 650, Route Des Lucioles, F-06921 Sophia-Antipolis Cedex, France, vol. RAN WG1, No. Kansas City, USA, May 14, 2008, XP050110365, [retrieved on May 14, 2008].

International Search Report and Written Opinion—PCT/US2010/052962, ISA/EPO—Apr. 28, 2011.

Jungnickel .V, et al., "Implementation concepts for distributed cooperative transmission", Signals, Systems and Computers, 2008 42nd Asilomar Conference on, IEEE, Piscataway, NJ, USA, Oct. 26, 2008, pp. 1035-1039, XP031475445, ISBN: 978-1-4244-2940-0.

Li L, et al., "A Novel Semi-Dynamic Inter-Cell Interference Coordination Scheme Based on User Grouping", Vehicular Technology Conference Fall (VTC 2009-Fall), 2009 IEEE 70th, IEEE, Piscataway, NJ, USA, Sep. 20, 2009, pp. 1-5, XP031600186, ISBN: 978-1-4244-2514-3.

Nokia Siemens Networks et al., Considerations on Initialization and Mapping of DM-RS Sequence, 3GPP Draft, R1-093304, 3rd Generation Partnership Project (3GPP), Mobile Competence Centre , 650, Route Des Lucioles , F-06921 Sophia Antipolis Cedex , France, No. Shenzhen, China, Aug. 19, 2009, XP050351628.

Nokia Siemens Networks et al., "Scrambling Sequence Initialisation", 3GPP Draft, R1- 080940_Scramblinginit, 3rd Generation Partnership Project (3GPP), Mobile Competence Centre, 650, Route Des Lucioles, F-06921 Sophia-Antipolis Cedex, France, vol. RAN WG1, No. Sorrento, Italy, Feb. 5, 2008, XP050109412, [retrieved on Feb. 5, 2008].

Panasonic: "Discussion on PUCCH coordination for UL CoMP", 3GPP Draft; R1-091165, 3rd Generation Partnership Project (3GPP), Mobile Competence Centre ; 650, Route Des Lucioles ; F-06921 Sophia-Antipolis Cedex ; France, No. Seoul, Korea; Mar. 17, 2009, XP050338786, [retrieved on Mar. 17, 2009].

Qualcomm Europe: "DL MU-MIMO operation in LTE-A", 3GPP Draft; R1-094215 LTE-A MU-MIMO, 3rd Generation Partnership Project (3GPP), Mobile Competence Centre ; 650, Route Des Lucioles ; F-06921 Sophia-Antipolis Cedex ; France, No. Miyazaki; Oct. 12, 2009, XP050388684, [retrieved on Oct. 6, 2009].

Qualcomm Europe: "Further Considerations and Link Simulations on Reference Signals in LTE-A", 3GPP Draft, R1-090875, 3rd Generation Partnership Project (3GPP), Mobile Competence Centre, 650, Route Des Lucioles, F-06921 Sophia Antipolis Cedex, France, No. Athens, Greece, Feb. 4, 2009, XP050318724, [retrieved on Feb. 4, 2009].

Qualcomm Europe: "Specification details for PRS sequences", 3GPP Draft, R1-080466, 3rd Generation Partnership Project (3GPP), Mobile Competence Centre, 650, Route Des Lucioles, F-06921 Sophia-Antipolis Cedex , France, vol. RAN WGI, No. Sevilla, Spain, Jan. 9, 2008, XP050108984, [retrieved on Jan. 9, 2008].

Samsung: "Design Considerations for COMP Joint Transmission", 3GPP Draft, R1-091868 Design Considerations for COMP Joint Transmission, 3rd Generation Partnership Project (3GPP), Mobile Competence Centre, 650, Route Des Lucioles, F-06921 Sophia-Antipolis Cedex, France, No. San Francisco, USA, Apr. 28, 2009, XP050339364, [retrieved on Apr. 28, 2009].

Taiwan Search Report—TW099135271—TIPO—Oct. 11, 2012.

LTE; Evolved Universal Terrestrial Radio Access (E-UTRA); Physical channels and modulation (3GPP TS 36.211 version 8.7.0 Release 8) Technical Specification, European Telecommunications Standards Institute (ETSI), 650, Route Des Lucioles ; F-06921 Sophia-Antipolis ; France, No. V8.7.0, Jun. 1, 2009, XP014044748.

Ericsson, St-Ericsson: "Draft CR 36.211 Introduction of enhanced dual layer transmission", 3GPP TSG-RAN WG1#58b R1-094321 Miyazaki, Japan, 2009.

Philips: "Some RS Design Issues for Dual layer Beamforming", 3GPP Draft, R1-094329, 3rd Generation Partnership Project (3GPP), Mobile Competence Centre, 650, Route Des Lucioles, F-06921 Sophia-Antipolis Cedex, France, No. Miyazaki, Oct. 12, 2009.

Panasonic, "Discussion on PUCCH Coordination for UL CoMP", 3GPP TSG-RAN WG1 Meeting #56, R1-090687, Feb. 3, 2009 (3GPP TSG-RAN WG1 ftp upload date), pp. 1-2.

* cited by examiner

| Offsets m' from the Random Sequence | CRS tones index k within a symbol (v=0) | CRS tones index k within a symbol (v=3) |
|---|---|---|
| 104 | 0 | 3 |
| 105 | 6 | 9 |
| 106 | 12 | 15 |
| 107 | 18 | 21 |
| 108 | 24 | 27 |
| 109 | 30 | 33 |
| 110 | 36 | 39 |
| 111 | 42 | 45 |
| 112 | 48 | 51 |
| 113 | 54 | 57 |
| 114 | 60 | 63 |
| 115 | 66 | 69 |

FIG. 4

| Offsets m' from the Random Sequence | CRS tones index k within a symbol (v=0) | CRS tones index k within a symbol (v=3) |
|---|---|---|
| 95 | 0 | 3 |
| 96 | 6 | 9 |
| 97 | 12 | 15 |
| 98 | 18 | 21 |
| 99 | 24 | 27 |
| 100 | 30 | 33 |
| 101 | 36 | 39 |
| 102 | 42 | 45 |
| 103 | 48 | 51 |
| 104 | 54 | 57 |
| 105 | 60 | 63 |
| 106 | 66 | 69 |
| 107 | 72 | 642 |
| 108 | 78 | 648 |
| 109 | 84 | 654 |
| 110 | 90 | 660 |
| 111 | 96 | 666 |
| 112 | 102 | 672 |
| 113 | 108 | 678 |
| 114 | 114 | 684 |
| 115 | 120 | 690 |
| 116 | 126 | 696 |
| 117 | 132 | 702 |
| 118 | 138 | 708 |
| 119 | 144 | 714 |
| 120 | 150 | 720 |
| 121 | 156 | 726 |
| 122 | 162 | 732 |
| 123 | 168 | 738 |
| 124 | 174 | 744 |

*FIG. 5*

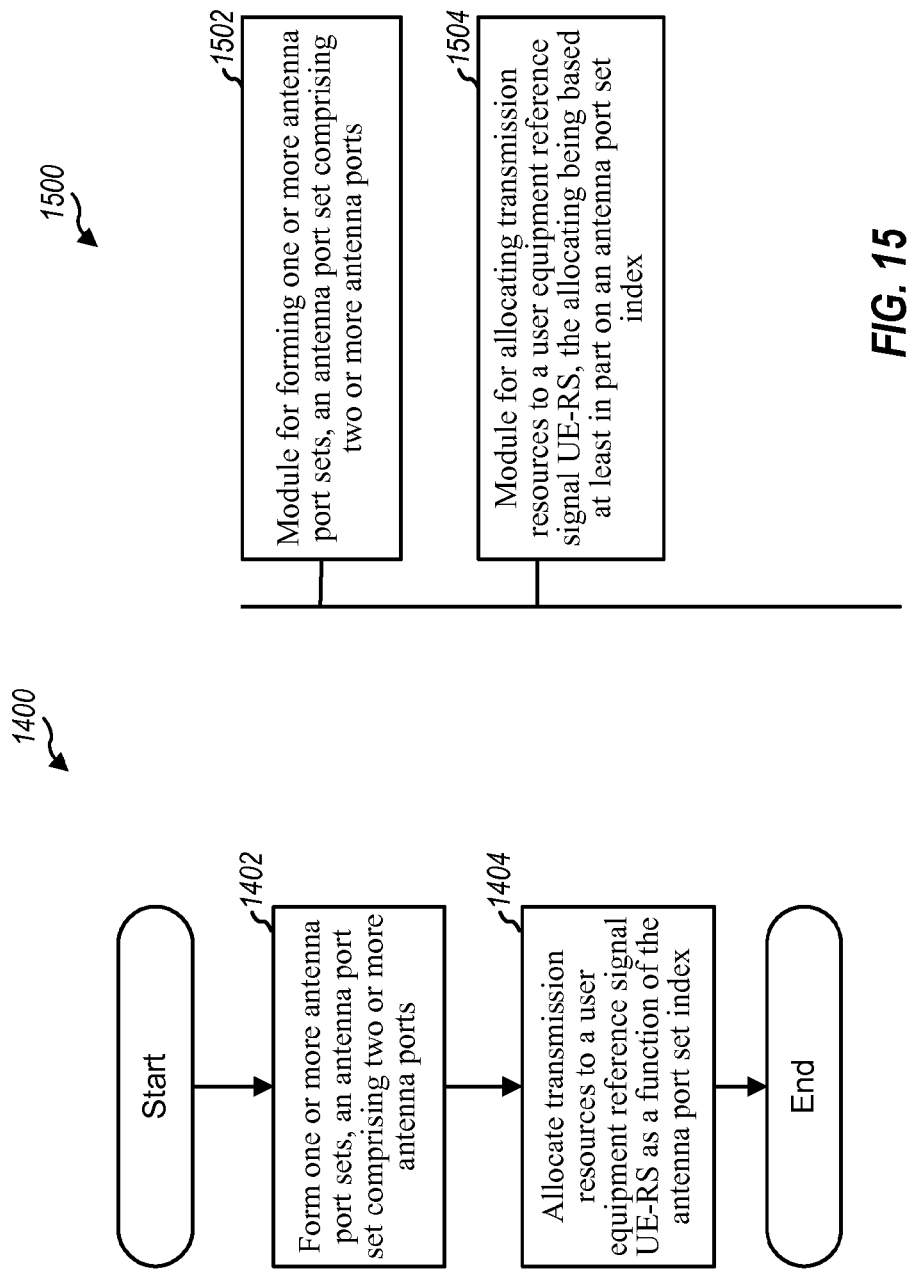

METHOD AND APPARATUS FOR REFERENCE SIGNAL SEQUENCE MAPPING IN WIRELESS COMMUNICATION

CROSS-REFERENCE TO RELATED APPLICATIONS

This application claims the benefit of U.S. Provisional Patent Application Ser. No. 61/251,939 entitled "METHOD AND APPARATUS FOR REFERENCE SIGNAL SEQUENCE MAPPING IN WIRELESS COMMUNICATION" filed Oct. 15, 2009. The entirety of the aforementioned application is herein incorporated by reference.

BACKGROUND

I. Technical Field

The following description relates generally to wireless communications, and more particularly to mapping resource elements for transmission of a reference signal over a channel.

II. Relevant Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_s$ independent channels corresponds to a dimension. The MIMO system can provide improved performance (e.g., higher throughput and/or greater reliability) if the additional dimensionalities created by the multiple transmit and receive antennas are utilized.

Wireless systems often use reference signals in the uplink (UL) or in the downlink (DL) direction for channel characterization and performance improvement. In conventional wireless systems, such as the Release-8 version of the Long Term Evolution (LTE) specification (Rel-8), certain algorithms are defined for selecting time/frequency locations used for transmissions of the reference signals in UL or DL direction. However, these conventional algorithms are limited to a single layer transmission of certain reference signals, such as the user equipment reference signal (UE-RS). With the introduction of multi-user multiple-input, multiple-output (MU-MIMO) wireless systems, such as LTE Release 9 (Rel-9), there is a need to extend the reference signal framework to support the increased number of antennas and beamforming in multiple layers of transmission.

SUMMARY

The systems and methods provided in this disclosure meet the above discussed needs, and others. Briefly and in general terms, the disclosed designs provide methods and apparatuses for mapping transmission resources to UE-RS in a MIMO system.

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In an aspect, a wireless communication method implemented in a multi-input multi-output MIMO system is disclosed. The method comprises forming one or more antenna port sets, wherein an antenna port set comprises two or more antenna ports and allocating transmission resources to a user equipment reference signal UE-RS, the allocating being based at least in part on an antenna port set index.

In another aspect, a wireless communication apparatus for use in a multi-input multi-output MIMO system is disclosed. The apparatus comprises means for forming one or more antenna port sets, wherein an antenna port set comprises two or more antenna ports and means for allocating transmission resources to a user equipment reference signal UE-RS, the allocating being based at least in part on an antenna port set index.

In another aspect, a computer program product comprising a computer-readable storage medium is disclosed. The computer-readable storage medium includes instructions for causing at least one computer to form one or more antenna port sets, wherein an antenna port set comprises two or more antenna ports and instructions for causing the at least one computer to allocate transmission resources to a user equipment reference signal UE-RS, the allocation being based at least in part on an antenna port set index.

In another aspect, a wireless communication apparatus comprising a processor is disclosed. The processor is configured for forming one or more antenna port sets, wherein an antenna port set comprises two or more antenna ports and allocating transmission resources to a user equipment reference signal UE-RS, the allocating being based at least in part on an antenna port set index.

In another aspect, a wireless communication method implemented in a multi-input multi-output MIMO system is disclosed. The method comprises receiving an assignment of an antenna port set index wherein an antenna port set comprises two or more antenna ports and receiving transmission of a user equipment reference signal UE-RS, the transmission being based at least in part on the antenna port set index.

In another aspect, a wireless communication apparatus for use in a multi-input multi-output MIMO system is disclosed. The apparatus comprises means for receiving an assignment of an antenna port set index wherein an antenna port set comprises two or more antenna ports and means for receiving transmission of a user equipment reference signal UE-RS, the transmission being based at least in part on the antenna port set index.

In another aspect a computer program product comprising a computer-readable storage medium is disclosed. The computer-readable storage medium includes instructions for causing at least one computer to receive an assignment of an antenna port set index wherein an antenna port set comprises a logical group of two or more antenna ports and receive transmission of a user equipment reference signal UE-RS, the transmission being based at least in part on the antenna port set index.

In another aspect, a wireless communication apparatus is disclosed. The communication apparatus comprises a processor configured for receiving an assignment of an antenna port set index wherein an antenna port set comprises two or more antenna ports; and receiving transmission of a user equipment reference signal UE-RS, the transmission being based at least in part on the antenna port set index.

To the accomplishment of the foregoing and related ends, one or more aspects comprise the features hereinafter fully described and particularly pointed out in the claims. The following description and the annexed drawings set forth in detail certain illustrative aspects and are indicative of but a few of the various ways in which the principles of the aspects may be employed. Other advantages and novel features will become apparent from the following detailed description when considered in conjunction with the drawings and the disclosed aspects are intended to include all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein:

FIG. 4 illustrates an example transmission resource assignment for a common reference signal.

FIG. 5 illustrates another example transmission resource assignment for a common reference signal.

FIG. 14 illustrates a flow chart representation of a process of wireless communication.

FIG. 15 illustrates a block diagram representation of an apparatus for wireless communication.

DESCRIPTION

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form in order to facilitate describing these aspects.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). CDMA2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). CDMA2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below.

Single carrier frequency division multiple access (SC-FDMA), which utilizes single carrier modulation and frequency domain equalization is a technique. SC-FDMA has similar performance and essentially the same overall complexity as those of OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for uplink multiple access scheme in 3GPP Long Term Evolution (LTE), or Evolved UTRA.

Figure 1:
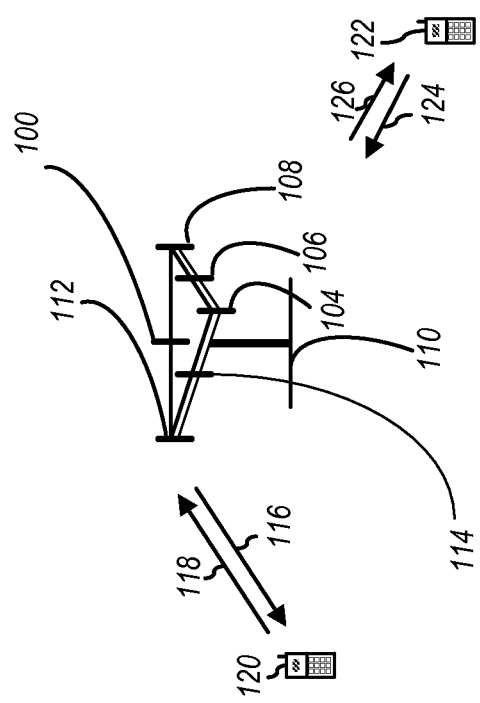
FIG. 1 illustrates a multiple access wireless communication system according to one embodiment.

Referring to FIG. 1, a multiple access wireless communication system according to one embodiment is illustrated. An access point 110 (AP) includes multiple antenna groups, one including 104 and 106, another including 108 and 100, and an additional including 112 and 114. In FIG. 1, only two antennas are shown for each antenna group, however, more or fewer antennas may be utilized for each antenna group. Access terminal 120 (AT) is in communication with antennas 112 and 114, where antennas 112 and 114 transmit information to access terminal 120 over forward link 116 and receive information from access terminal 120 over reverse link 118. Access terminal 122 is in communication with antennas 106 and 108, where antennas 106 and 108 transmit information to access terminal 122 over forward link 126 and receive information from access terminal 122 over reverse link 124. In a FDD system, communication links 118, 116, 124 and 126 may use different frequency for communication. For example, forward link 116 may use a different frequency then that used by reverse link 118.

Each group of antennas and/or the area in which they are designed to communicate is often referred to as a sector of the access point. In the embodiment, antenna groups each are designed to communicate to access terminals in a sector, of the areas covered by access point 110.

In communication over forward links 116 and 126, the transmitting antennas of access point 110 utilize beamforming in order to improve the signal-to-noise ratio of forward links for the different access terminals 120 and 122. Also, an access point using beamforming to transmit to access terminals scattered randomly through its coverage causes less interference to access terminals in neighboring cells than an access point transmitting through a single antenna to all its access terminals.

An access point 110 may be a fixed station used for communicating with the terminals and may also be referred to as an access point, a Node B (eNB), or some other terminology. An access terminal may also be called an access terminal, user equipment (UE), a wireless communication device, terminal, access terminal or some other terminology.

Figure 2:
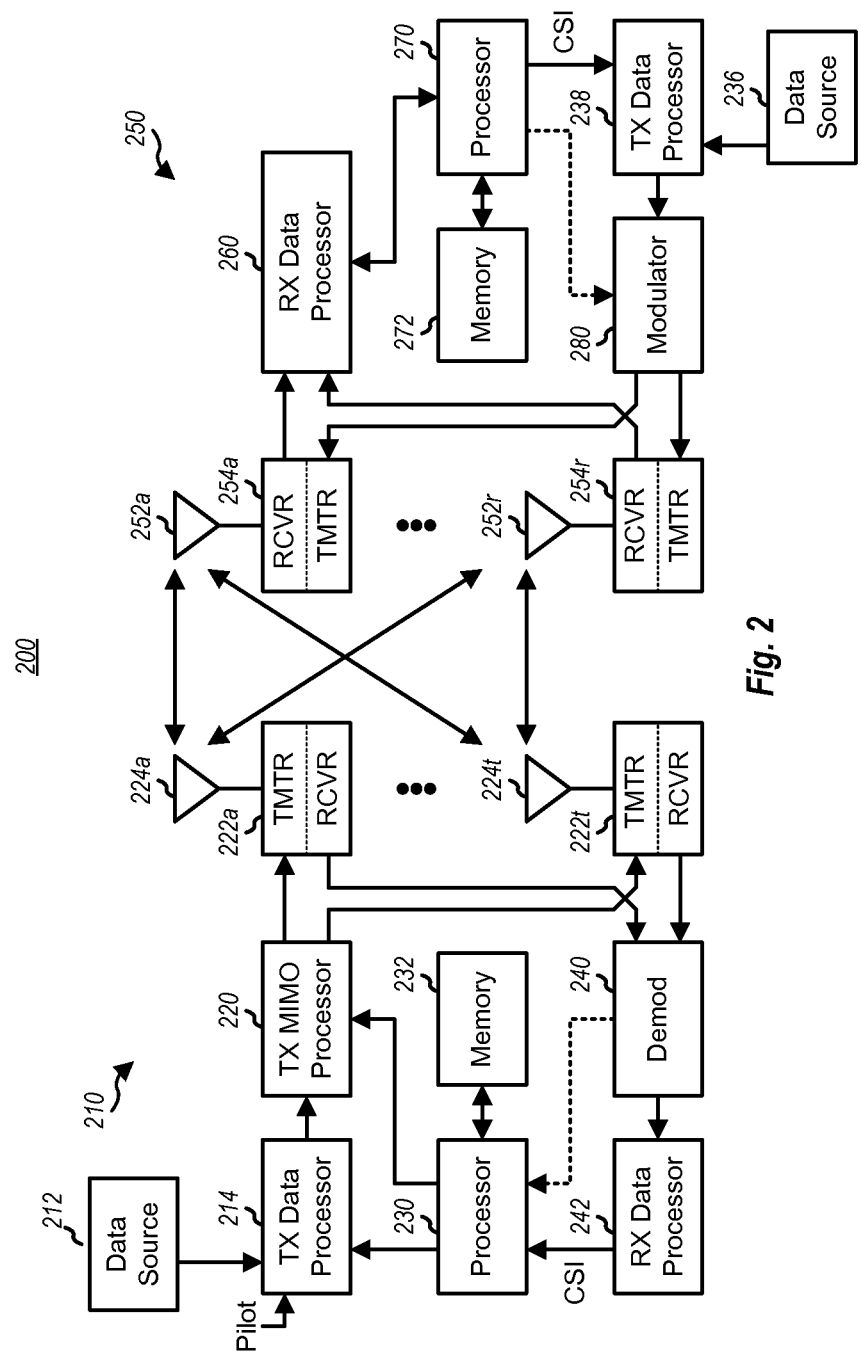
FIG. 2 illustrates a block diagram of a wireless communication transceiver apparatus.

FIG. 2 is a block diagram of an embodiment of a transmitter system 210 (also known as the access point or eNB) and a receiver system 250 (also known as access terminal or UE) in a MIMO system 200. At the transmitter system 210, traffic data for a number of data streams is provided from a data source 212 to a transmit (TX) data processor 214.

In an embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

In an aspect, logical channels are classified into Control Channels and Traffic Channels. Logical Control Channels comprises Broadcast Control Channel (BCCH) which is DL channel for broadcasting system control information. Paging Control Channel (PCCH) which is DL channel that transfers paging information. Multicast Control Channel (MCCH) which is Point-to-multipoint DL channel used for transmitting Multimedia Broadcast and Multicast Service (MBMS) scheduling and control information for one or several MTCHs. Generally, after establishing RRC connection this channel is only used by UEs that receive MBMS (Note: old MCCH+MSCH). Dedicated Control Channel (DCCH) is Point-to-point bi-directional channel that transmits dedicated control information and used by UEs having an RRC connection. In aspect, Logical Traffic Channels comprises a Dedicated Traffic Channel (DTCH) which is Point-to-point bi-directional channel, dedicated to one UE, for the transfer of user information. Also, a Multicast Traffic Channel (MTCH) for Point-to-multipoint DL channel for transmitting traffic data.

In an aspect, Transport Channels are classified into DL and UL. DL Transport Channels comprises a Broadcast Channel (BCH), Downlink Shared Data Channel (DL-SDCH) and a Paging Channel (PCH), the PCH for support of UE power saving (DRX cycle is indicated by the network to the UE), broadcasted over entire cell and mapped to PHY resources which can be used for other control/traffic channels. The UL Transport Channels comprises a Random Access Channel (RACH), a Request Channel (REQCH), a Uplink Shared Data Channel (UL-SDCH) and plurality of PHY channels. The PHY channels comprises a set of DL channels and UL channels.

Figure 3:
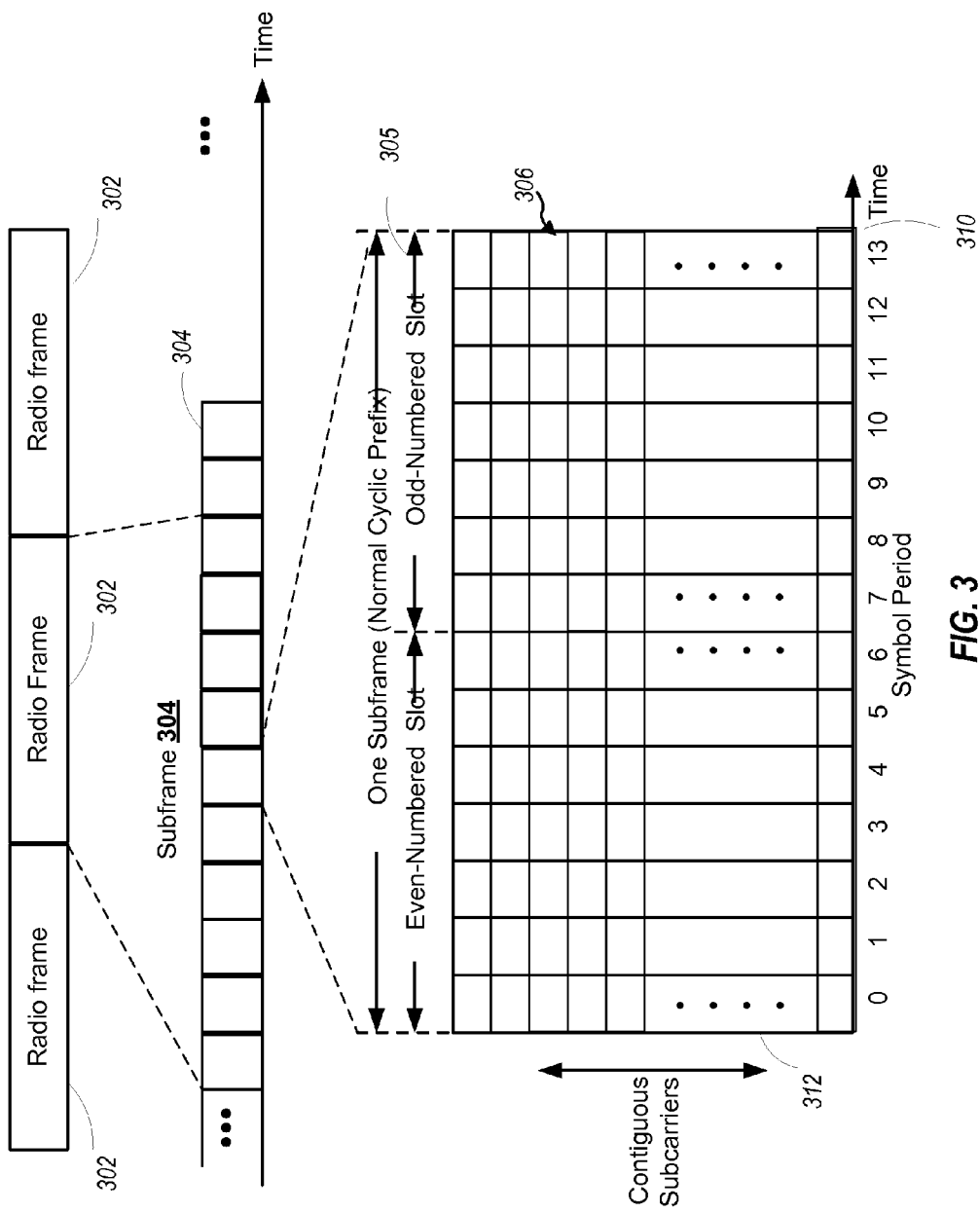
FIG. 3 illustrates a diagrammatic representation of a transmission format.

FIG. 3 shows a DL transmission format in certain wireless systems. This representation is sometimes called a "resource grid," referring to transmission resources shown. The transmissions may be logically organized as successive transmissions of radio frames 302. A radio frame 302 may, for example, have a predetermined time duration. Each radio frame 302 may further be organized as a number of subframes 304, each subframe 304 comprising a number of slots 305 in which a number of orthogonal frequency domain multiplexing (OFDM) symbols are transmitted (depicted along horizontal axis 310). Each OFDM symbol may comprise a number of subcarriers (depicted along vertical axis 312), at least some of which can be assigned to different signals, independent of each other. For example, in LTE, a radio frame 302 represents 10 ms and comprises ten subframes 304, each occupying 1 ms. Each subframe 304 comprises two slots 305 (even-numbered and odd-numbered slot). For normal cyclic prefix (CP) transmissions, seven OFDM symbols may be transmitted in each slot 305 and, for extended CP transmissions (not shown), six OFDM symbols may be transmitted in each slot. In some designs, one subcarrier of one OFDM symbol may represent the smallest unit of allocation of transmission resources, shown in FIG. 3 as a resource element 306 (RE). In LTE, for example, one RE 306 may correspond to a 15 KHz subcarrier assignment within a single OFDM symbol. In certain designs, subcarriers may be assigned in units of a certain number of sub-carriers (e.g., twelve), resulting in a physical resource block (e.g., 180 KHz), representing a unit of transmission resources assigned to a certain transmission.

Still referring to FIG. 3, it will be seen that, in certain designs, transmission resources (or REs 306) assigned to transmissions of a particular signal may be varied as a function of a radio frame index, a subframe index within a radio frame 302 (e.g., 0 to 9), a slot index within a subframe 304 (e.g., 0 or 1), an OFDM symbol index within a slot and a subcarrier index within the OFDM symbol. While such a large number of degrees of freedom are available to a scheduler to allocate REs 306 to the transmission of a particular signal, in practice, a certain amount of predictability and repetitiveness is introduced to simplify the allocation of REs 306 to signal transmissions. This simplification may help, for example, relieve a scheduler of the computational burden and also reduced the transmission overhead required to signal RE locations for transmission signals to intended receivers.

In LTE, for example, transmission resource assignment for certain transmissions (e.g., reference signals) may be performed using certain predetermined patterns, known to both a transmitter and a receiver, to compute locations of REs 306 assigned to the transmissions, at both the transmitter and the receiver, without having to explicitly signal the locations. For the purposes of reducing inter-cell interference, the reference signals may be scrambled by predetermined pseudo-random sequence, known to both a transmitter and a receiver. The pseudo-random sequences may be determined by initialization parameters or initialization sequences known to both a transmitter and a receiver. The initialization sequences may, for example, be initialized at the beginning of each symbol, to compute the pseudo-random sequence within the symbol. The pseudo-random assignment of modulation symbol values to be used in REs 306 may help reduce or eliminate interference or cross-correlation between different transmitters. Furthermore, pseudo-random assignment of modulation symbol values to be used in REs 306 may also improve channel estimation performance.

As an example, in Rel-8, the common reference signal (CRS) (also referred to as cell-specific reference signal) is defined by a reference signal sequence $r_{l,n_s}(m)$, where $n_s$ is the slot number within a radio frame 302 and l is the OFDM symbol number within the slot 305, as follows:

$$r_{l,n_s}(m) = \frac{1}{\sqrt{2}}(1 - 2 \cdot c(2m)) + j\frac{1}{\sqrt{2}}(1 - 2 \cdot c(2m+1)), \quad \text{Eq. (1)}$$

$$m = 0, 1, \ldots, 2N_{RB}^{max,DL} - 1.$$

The pseudo-random sequence c(i) is defined in Section 7.2 of the Rel-8 specification. The pseudo-random sequence generator is initialized with $$c_{init} = 2^{10} \cdot (7 \cdot (n_s + 1) + l + 1) \cdot (2 \cdot N_{ID}^{cell} + 1) + 2 \cdot N_{ID}^{cell} + N_{CP} \quad \text{Eq. (2)}$$

at the start of each OFDM symbol where $$N_{CP} = \begin{cases} 1 & \text{for normal } CP \\ 0 & \text{for extended } CP \end{cases} \quad \text{Eq. (3)}$$

The initialization shown in Eq. (3) is bandwidth agnostic. In other words, the CRS allocation uses the maximum possible DL bandwidth available in initialization of the sequence generator used for RE mapping.

Furthermore, it may be noted that because the initialization sequence shown in Eq. (2) and (3) is a function of the slot number and the OFDM symbol number, the sequence is initialized differently for different symbols and different slots. In certain designs, the initialization uses the actual symbol location of CRS (e.g., l=0, 4 for normal CP) instead of an ordered occurrences of CRS symbols (the first/second occurrence of CRS in one slot, being designated as l=0, 1). Also, the initialization is cell-specific and is dependent on the CP type (normal or extended).

Rel-8 specifies that the reference signal sequence $r_{l,n_s}(m)$ is mapped to complex-valued modulation symbols $a_{k,l}^{(p)}$ used as reference symbols for antenna port p in slot $n_s$ according to:

$$a_{k,l}^{(p)} = r_{l,n_s}(m'), \quad \text{Eq (4)}$$

where $$k = 6m + (v + v_{shift}) \bmod 6 \quad \text{Eq (5)}$$

$$l = \begin{cases} 0, N_{symb}^{DL} - 3 & \text{if } p \in \{0, 1\} \\ 1 & \text{if } p \in \{2, 3\} \end{cases}$$

$$m = 0, 1, \ldots, 2 \cdot N_{RB}^{DL} - 1$$

$$m' = m + N_{RB}^{max,DL} - N_{RB}^{DL}$$

The variables v and $v_{shift}$ define the position in the frequency domain for the different reference signals where v is given by $$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(n_s \bmod 2) & \text{if } p = 2 \\ 3 + 3(n_s \bmod 2) & \text{if } p = 3 \end{cases} \quad \text{Eq (6)}$$

The cell-specific frequency shift is given by $$v_{shift} = N_{ID}^{cell} \bmod 6. \quad \text{Eq. (7)}$$

In the above equation, $N_{RB}^{max,DL}$ represents the maximum DL bandwidth (in RBs). Furthermore, LTE-8 specifies that within one symbol, the mapping is contiguous using the same initialization and across symbols (in the same slot or different slots), the same set of samples are used but with different initializations.

FIG. 4 is a table 400 that shows an example mapping for normal CP, $N_{ID}^{cell}=480$, $N_{RB}^{DL}=6$ (RBs), generated according to Eqs. (4) to (7). The sequence is initialized with 7873473 when l=0 (antenna ports 0/1), 8857537 when l=1 (antenna ports 2/3), 11809729 when l=4 (antenna ports 0/1) for $n_s$=0, etc. Row entries 402 show offsets m' from the initialized random sequence (column 404), with column 406 listing tones (subcarriers) assigned to CRS transmissions for v=0 and column 408 listing tones assigned to CRS transmissions for v=3.

FIG. 5 is a table 500 that shows another exampling of mapping for normal CP where $N_{ID}^{cell}=480$, but $N_{RB}^{DL}$ is now 15 (RBs), generated according to Eqs. (4) to (7). The initialization of the sequence is similar to the initialization described with respect to FIG. 4. Column 504 lists offsets m' from the initialized sequence. Column 506 lists tomes assigned to CRS transmissions for v=0 and column 508 lists tones assigned to CRS transmissions for v=3.

Note that the bandwidth agnostic feature can be seen by comparing FIGS. 4 and 5 where with 15 RBs system bandwidth, the center 6 RBs (entries 502 in FIG. 5) have the same set of random samples as those for the 6 RBs system bandwidth case (entries 402 in the first column of FIG. 4).

In LTE Rel-8, for DL transmission mode 7, UE-specific reference signal (UE-RS) is specified to support single-layer beamforming. In 3GPP TS 36.211, Section 6.10.3.1, the UE-RS sequence r(m) is defined by:

$$r(m) = \frac{1}{\sqrt{2}}(1 - 2 \cdot c(2m)) + j\frac{1}{\sqrt{2}}(1 - 2 \cdot c(2m+1)), \quad \text{Eq. (8)}$$

$$m = 0, 1, \ldots, 12 N_{RB}^{PDSCH} - 1;$$

where $N_{RB}^{PDSCH}$ denotes the bandwidth in RBs of the corresponding PDSCH transmission. The pseudo-random sequence c(i) is defined in Section 7.2 of 3GPP TS 36.211. The pseudo-random sequence generator is initialized with $$c_{init} = (\lfloor n_s/2 \rfloor + 1) \cdot (2N_{ID}^{cell} + 1) \cdot 2^{16} + n_{RNTI} \quad \text{(Eq. 9)}$$

at the start of each subframe where $n_{RNTI}$ is as described in Section 7.1 of 3GPP TS 36.213, which comprises a UE-specific ID and $N_{ID}^{cell}$ is a cell-specific identifier.

It is evident from an inspection of Eq. (8) and Eq. (9) that the initialization is a function of slots, is cell and UE-specific and is not bandwidth agnostics (because of dependency on the assigned PDSCH bandwidth $N_{RB}^{PDSCH}$).

The 3GPP TS 36.211 further specifies that, in a PRB with a frequency-domain index $n_{PRB}$ assigned for the corresponding PDSCH transmission, the reference signal sequence r(m) is mapped to complex-valued modulation symbols $a_{k,l}^{(p)}$ with p=5 in a subframe according to Eq. (11) for a normal CP subframe and Eq. (12) for an extended CP subframe. The parameter $a_{k,l}^{(p)}$ is given as:

$$a_{k,l}^{(p)} = r(3 \cdot l' \cdot N_{RB}^{PDSCH} + m'). \quad \text{Eq (10)}$$

For normal CP:

$$k = (k') \bmod N_{sc}^{RB} + N_{sc}^{RB} \cdot n_{PRB} \quad \text{Eq (11)}$$

$$k' = \begin{cases} 4m' + v_{shift} & \text{if } l \in \{2, 3\} \\ 4m' + (2 + v_{shift}) \bmod 4 & \text{if } l \in \{5, 6\} \end{cases}$$

$$l = \begin{cases} 3 & l' = 0 \\ 6 & l' = 1 \\ 2 & l' = 2 \\ 5 & l' = 3 \end{cases}$$

$$l' = \begin{cases} 0, 1 & \text{if } n_s \bmod 2 = 0 \\ 2, 3 & \text{if } n_s \bmod 2 = 1 \end{cases}$$

$$m' = 0, 1, \ldots, 3N_{RB}^{PDSCH} - 1$$

For extended CP:

$$a_{k,l}^{(p)} = r(4 \cdot l' \cdot N_{RB}^{PDSCH} + m') \quad \text{Eq. (12)}$$

$$k = (k') \bmod N_{sc}^{RB} + N_{sc}^{RB} \cdot n_{PRB}$$

$$k' = \begin{cases} 3m' + v_{shift} & \text{if } l = 4 \\ 3m' + (2 + v_{shift}) \bmod 3 & \text{if } l = 1 \end{cases}$$

$$l = \begin{cases} 4 & l' \in \{0, 2\} \\ 1 & l' = 1 \end{cases} \quad \text{Eq. (13)}$$

$$l' = \begin{cases} 0 & \text{if } n_s \bmod 2 = 0 \\ 1, 2 & \text{if } n_s \bmod 2 = 1 \end{cases}$$

$$m' = 0, 1, \ldots, 4N_{RB}^{PDSCH} - 1$$

where m' is the counter of UE-specific reference signal resource elements 306 within a respective OFDM symbol of the PDSCH transmission.

The cell-specific frequency shift is given by $$v_{shift} = N_{ID}^{cell} \bmod 3. \quad \text{Eq. (14)}$$

Rel-8 further specifies that the mapping will be in the increasing order of the frequency-domain index $n_{PRB}$ of the PRBs assigned for the corresponding PDSCH transmission. The quantity $N_{RB}^{PDSCH}$ denotes the bandwidth in resource blocks of the corresponding PDSCH transmission.

It is evident from Eqs. (10) to (12) that within each subframe, across all the symbols/slots containing UE-RS, the set of the random samples chosen are contiguous. Furthermore, across subframes, the same set of random samples, but different initializations are used. In addition, within each UE-RS symbol, regardless of the PDSCH allocation being contiguous or non-contiguous, the set of random samples are always contiguous, and the symbol indices used in the mapping is ordered occurrences of UE-RS symbols (0, 1, 2, 3) instead of the actual symbol index (3, 6, 2, 5).

Figure 6:
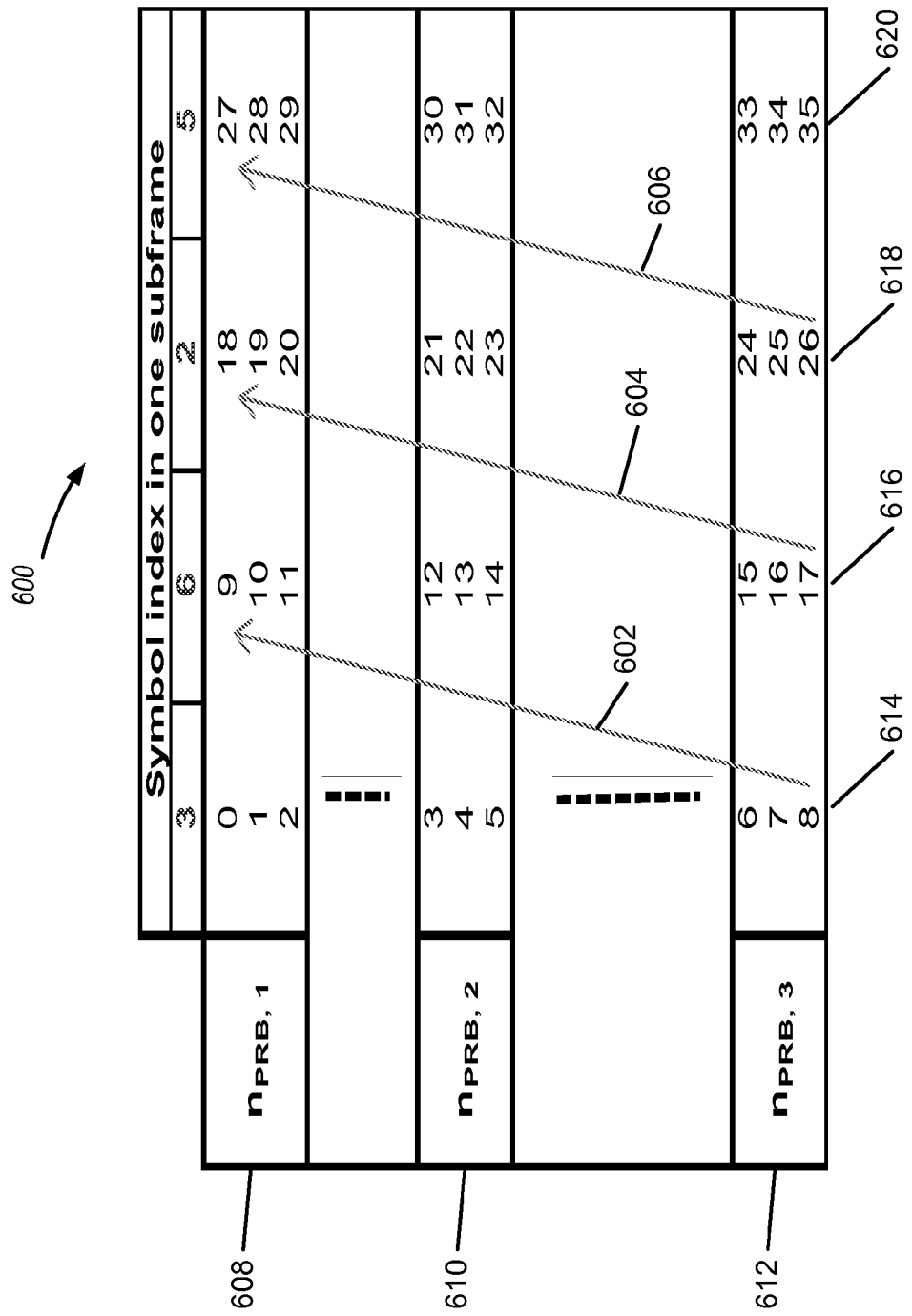
FIG. 6 illustrates an example UE-RS resource mapping.

FIG. 6 is a table 600 showing an example mapping for the case of $N_{RB}^{PDSCH}=3$ RBs. Rows 608, 610 and 612 correspond to three RBs, $n_{PRB,1}$, $n_{PRB,2}$ and $n_{PRB,3}$, assigned to the UE 120 receiving the UE-RS transmission, respectively. Note that the 3 RBs may or may not be contiguous. If 3 RBs are contiguous, then $n_{PRB,3}=n_{PRB,2}+1=n_{PRB,1}+2$. On the other hand, if 3 RBs are non-contiguous, then $n_{PRB,3}>n_{PRB,2}>n_{PRB,1}$, but $n_{PRB,3}=n_{PRB,2}+1=n_{PRB,1}+2$ may not hold.

Columns 614, 616, 618 and 620 correspond to offset values for symbol index numbers 3, 6, 2 and 5, respectively. In the present example, the three RBs assigned to the PDSCH are not contiguous. The UE-RS mapping for symbol index 3 (column 614) runs from 0 (top of the column 614) to 8 (bottom of the column 614). As indicated by arrows 602, 604 and 606, the resource mapping is contiguous from the end of one symbol to the beginning of the next symbol (e.g., arrow 602 indicates mapping index is "9" at the top of column 616, which is contiguous to the last mapping index "8" for the previous symbol index 3.)

Note also that $n_{PRB,1}$ is not necessarily equal to 0 (the first PRB of the system). Regardless of whether the 3 RBs are contiguous or not, the same mapping shown in FIG. 6 is applicable, which demonstrates that the UE-RS mapping is contiguous in the assigned PDSCH resources.

In designs that support dual-stream beamforming (e.g., LTE Rel-9), two UE-RS antenna ports are available for transmission within a given RE. In certain designs, the two antenna ports may be code division multiplexed (CDM). For MU-MIMO operation, it may be advantageous to maintain the orthogonality of transmissions from the two UE-RS antenna ports after resource mapping using a pseudo-random sequence and the assigned PDSCH resources. However, as can be seen from Eq. (9), if the sequence is initialized depending on a UE specific ID, the sequences generated for the paired UEs 120 may no longer be the same. As a result, the desired orthogonality of transmissions may not be maintained. In addition, one UE 120 may not know the pseudo-random sequence used by the other paired UE 120, as the UE-IDs are not mutually known between the paired UEs 120. Such non-orthogonality and unknown information about the other random sequence may cause significant interference on UE-RS, thereby reducing performance of a wireless system.

As seen from Eqs. (11) and (12), the random sequence is generated dependent on the assigned PDSCH bandwidth ($N_{RB}^{PDSCH}$) and mapped to the specific locations of the assigned PDSCH resources. It may be possible that UEs 120 paired in MU-MIMO transmissions may not be completely aligned (both in terms of the assigned bandwidth and the assigned location).

Figure 7:
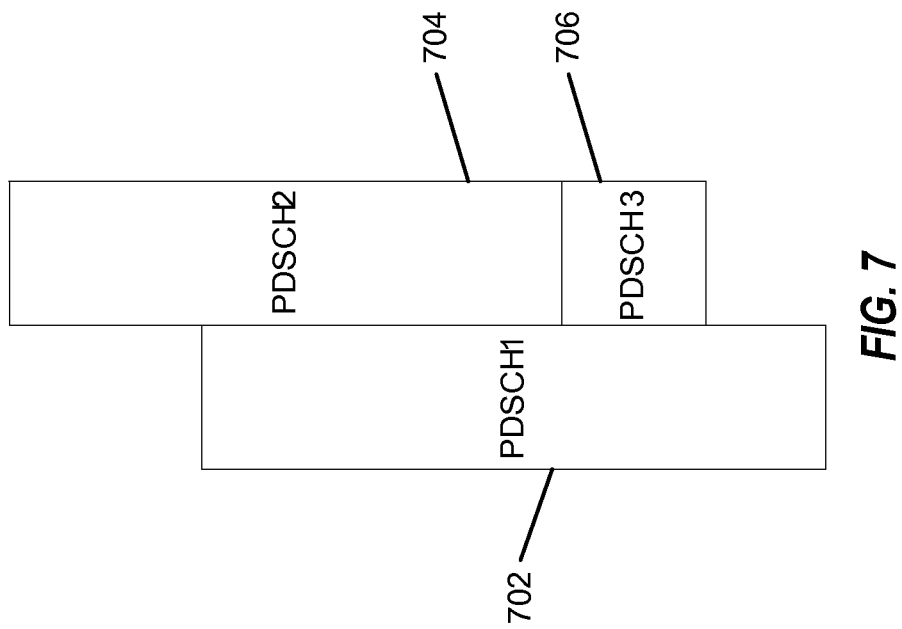
FIG. 7 illustrates a diagrammatic representation of resources assigned to physical downlink shared control channel.

With reference to FIG. 7, an example of PDSCH resource assignment to a pair of UEs 120 in a MU-MIMO system is shown. A first PDSCH resource 702 is shown which is assigned to a first UE 120 and a second PDSCH 704 is assigned to a second UE 120 that is paired with the first UE 120. It is clear that the PDSCH bandwidths associated with the first and second PDSCHs 702, 704 are not equal and are not aligned. In such a case, the pseudo-random sequences used for resource allocation for the paired UEs 120 may not be orthogonal.

Some designs may overcome the above limitation by using UE-independent UE-RS sequence initialization, i.e., removing UE-ID in the sequence initialization to have the form $c_{init}=f(n_{ID}^{cell},\lfloor n_s/2 \rfloor)$. It should be noted that, as used herein, the notation $f()$ merely suggests functional dependency of the parameter on the left hand side on parameters inside the parentheses, and such notations do not imply that the notation $f()$ necessarily represents one particular function. Co-pending U.S. patent application Ser. No. 12/890,182, entitled "UE-RS SEQUENCE INITIALIZATION FOR WIRELESS COMMUNICATION SYSTEM," discloses methods and apparatuses for UE-RS sequence initializations to achieve orthogonality. In certain designs, the sequence initialization may be bandwidth agnostic, such the index m in Eq. (9) can take the following values:

$$m=0,1,\ldots,12N_{RB}^{DL,max}-1, \quad \text{Eq. (15)}$$

where $N_{RB}^{DL,max}$ represents the maximum DL bandwidth (in RBs). This is in contrast to m=0, 1, . . . , $12N_{RB}^{PDSCH}-1$, used in Rel-8. In certain designs, $c_{init}$ may further be dependent on an antenna port index, a CP type, an RB ID, or a combination thereof.

In addition, in certain designs, when transmissions in multiple neighboring cells are coordinated, such as in coordinated multipoint transmission (CoMP) systems, the cell-specific initialization may not be applicable. In these designs, if multiple cells are involved together in serving one UE 120, using different cell IDs to initialize the random UE-RS sequence may result in non-orthogonal sequences among different cells as well. To solve this, a common cell ID may be used, e.g., the serving cell ID, such that Eq. (9) may be modified as follows:

$$c_{init}=f(N_{ID}^{ServingCell},\lfloor n_s/2 \rfloor). \quad \text{Eq. (16)}$$

In the above equation, $N_{ID}^{ServingCell}$ is an identification number of the serving cell for a UE 120, $n_s$ is the slot number, and $\lfloor \; \rfloor$ represents the floor operation. While these techniques, such as described with respect to Eqs. (15) and (16) may be able to overcome certain limitations of Rel-8 resource allocation by initializing a sequence as in Eqs. (15) and (16), the pseudorandom sequence so generated further needs to be mapped to appropriate REs in each time slot (or each OFDM symbol) to achieve orthogonality of transmissions.

Certain designs, as further described below, provide for techniques to map the sequence to resource elements such that the allocation density is dependent on a transmission rank. Furthermore, certain designs, further described below, provide for techniques in which allocated locations of REs 306 for UE-RS transmissions are dependent on antenna port indices. For example, two or more antenna ports may share the same set of REs 306 and may be differentiated in a CDM manner. Therefore, in general, UE-RS antenna ports can be differentiated via a mixture of CDM (if occupying the same frequency resources) and FDM. Furthermore, in certain designs, the allocation pattern for UE-RS is dependent on CP type (normal or extended), a subframe type, e.g., regular subframes, special subframes in TDD (DwPTS), relaying backhaul subframes, etc.

To meet the above and other aspects, in certain designs, the following the UE-RS sequence r(m) may be used.

$$r_{l,n_s}(m) = \frac{1}{\sqrt{2}}(1-2\cdot c(2m)) + j\frac{1}{\sqrt{2}}(1-2\cdot c(2m+1)), \quad \text{Eq. (17)}$$

$$m=0,1,\ldots,2N_{RB}^{max,DL}-1.$$

The various parameters used in Eq. (17) are further described below. As will be further explained below, the use of the mapping equation, as above, may be beneficial in a variety of different aspects.

With reference to FIGS. 8, 9, 10 and 11, some examples of UE-RS resource allocation patterns according to techniques described in this disclosure are shown.

Figure 8:
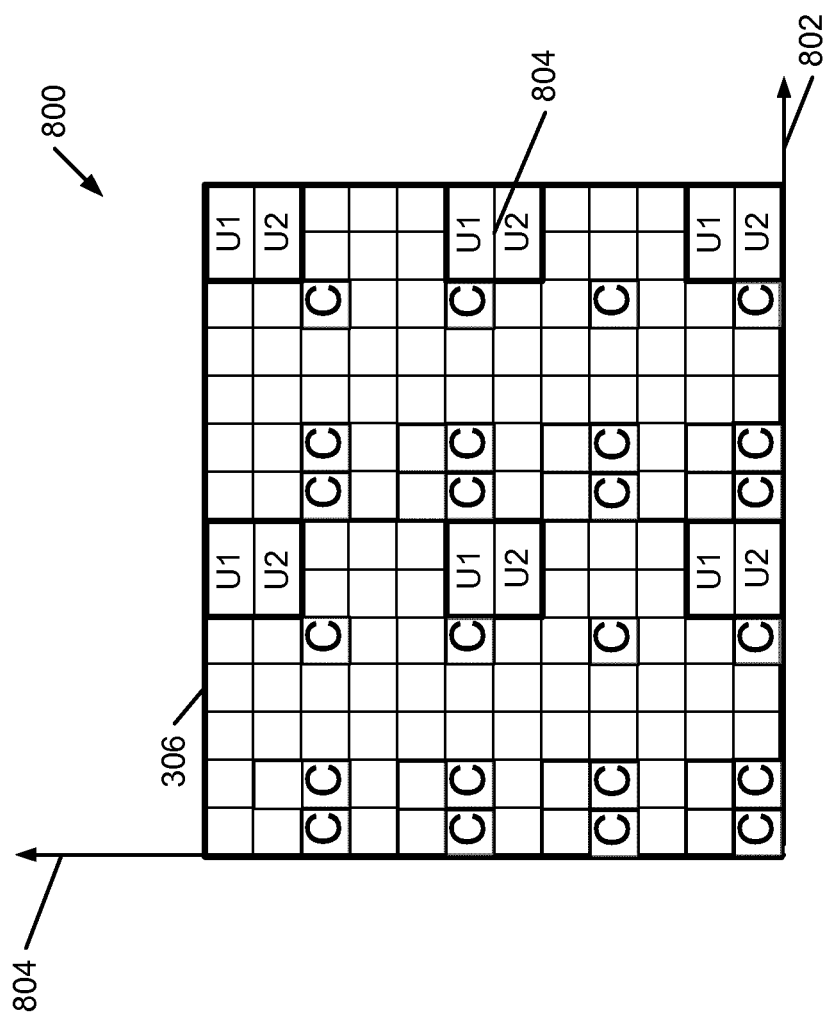
FIG. 8 illustrates an example resource allocation pattern for transmission of UE-RS.

FIG. 8 shows a resource grid 800 for a subframe with a normal CP. The horizontal axis 802 may represent time (symbol index) and the vertical axis may represent frequency. The resource elements (tiles) marked "C" may represent resources allocated to legacy references signals such as the common reference signal (CRS). Resource elements labeled U1 may be transmission resources allocation to a first antenna port set comprising two antenna ports. Resource elements labeled U2 may be transmission resources allocation to a second antenna port set comprising two antenna ports. The depicted example in FIG. 8 may correspond to a rank 3-4 system. The antenna ports forming an antenna port set may be, for example, 0/1 or 2/3. While each antenna in an antenna port set may occupy the entire resource labeled U1 (or U2), the two transmissions may be orthogonal in the code division (CDM).

Figure 9:
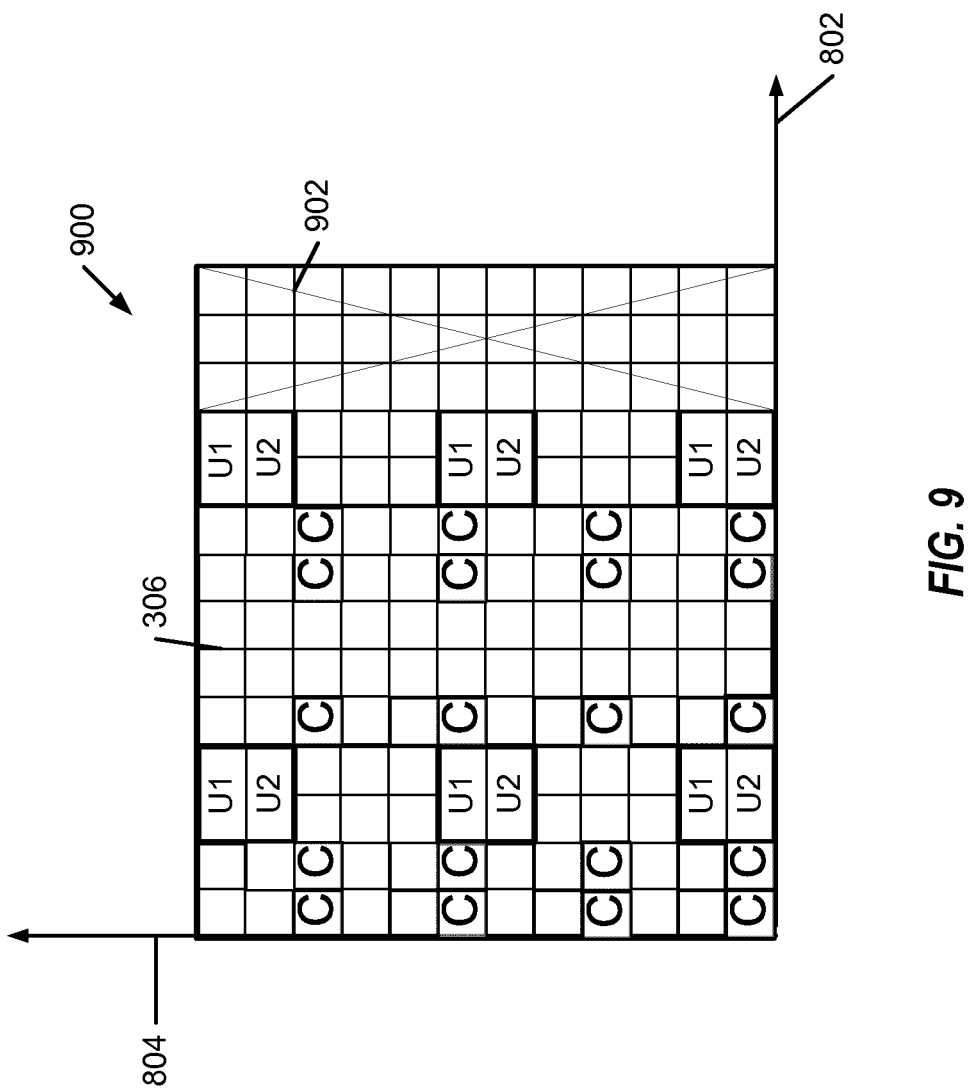
FIG. 9 illustrates another example resource allocation pattern for transmission of UE-RS.

FIG. 9 is a resource grid 900, depicting an example assignment of UE-RS transmission resources for a subframe including a downlink pilot time slot (DwPTS) with 11-12 symbols. As in FIG. 8, resource elements marked "C" may be assigned to reference signals such as the CRS. The last three symbols (marked as area 902) may not be available for UE-RS. Similar to the example in FIG. 8, UE-RS may be allocated to two antenna port sets (regions labeled U1 and U2), each including two antenna ports. The antenna ports in an antenna port set may occupy the same two contiguous REs but may maintain orthogonality by code division multiplexing their transmissions.

Figure 10:
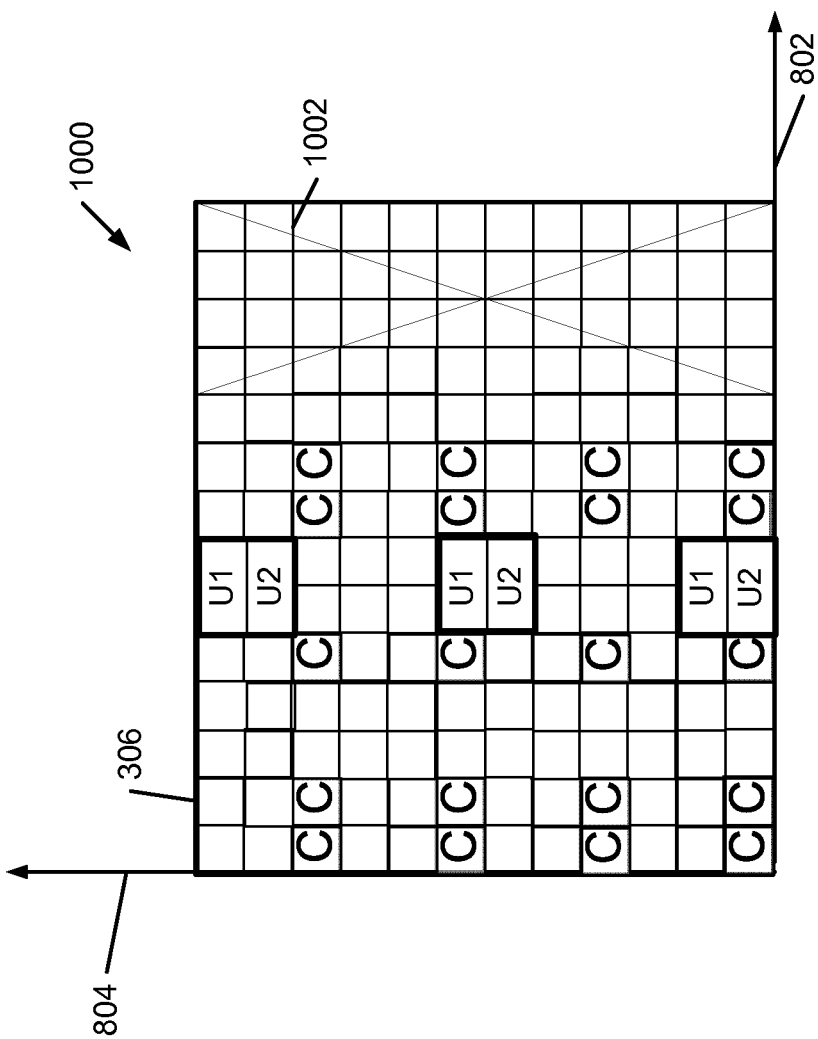
FIG. 10 illustrates yet another example resource allocation pattern for transmission of a reference signal.

FIG. 10 is a resource grid 1000, depicting an example assignment of UE-RS transmission resources for a subframe including a DwPTS with 9-10 symbols. As previously discussed, resources labeled U1 and U2 may be shared by two CDMed antenna ports (in a given antenna port set) each. The region marked 1002 may not available for UE-RS transmission because of the pilot time slot.

Figure 11:
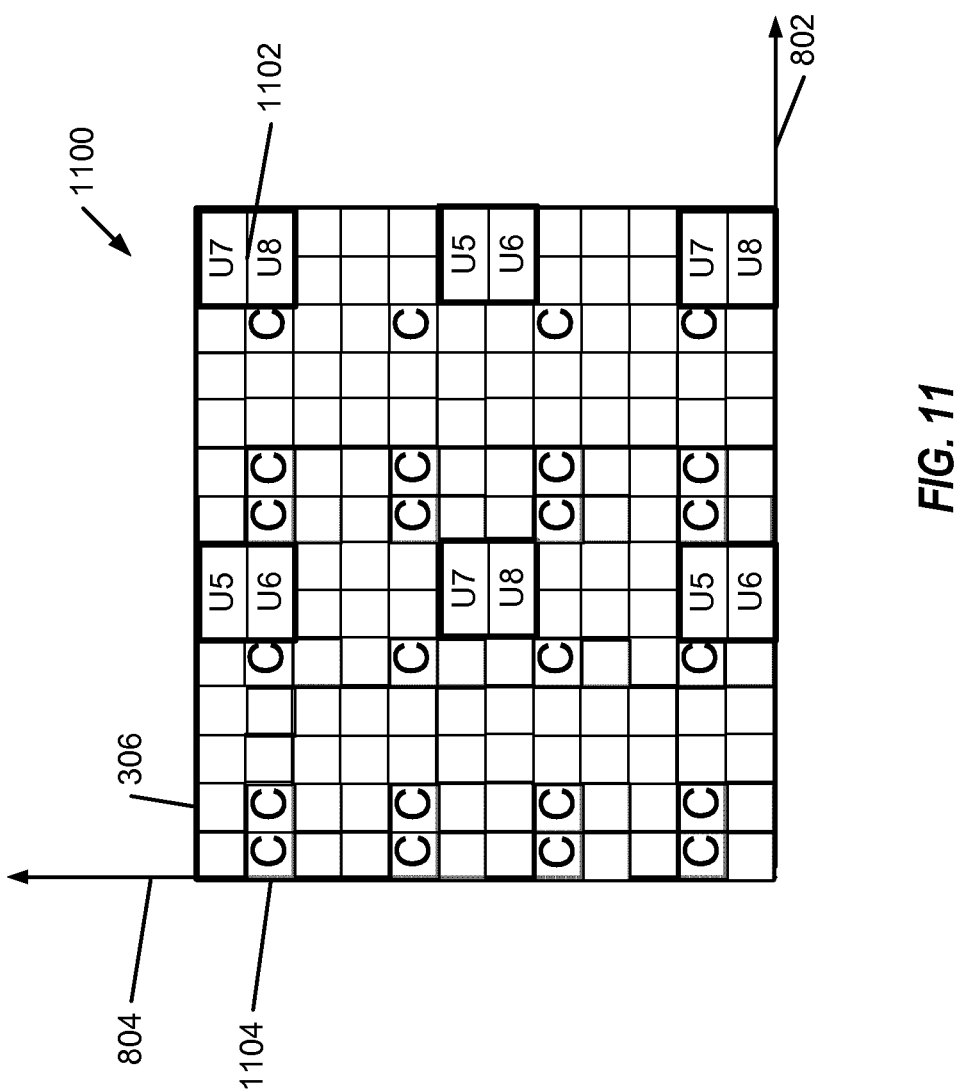
FIG. 11 illustrates yet another example resource allocation pattern for transmission of a reference signal.

FIG. 11 shows a resource grid 1100, depicting an example assignment of UE-RS transmission resources for normal CP subframe for a rank 5-8 MU-MIMO system. The resource grid 1100 shows REs 306 being assigned to four different of resources: U5, U6, U7 and U8. Each group may correspond to resources assigned to an antenna port set (e.g., comprising two antenna ports each). It may be noticed that the bandwidth allocated to antenna port sets using resources U5, U6, U7 and U8 (e.g., area 1102) is different in two slots within the subframe. Alternatively, resources U5 and U6 may be assigned to an antenna port set comprising four antenna ports, all code division orthogonally multiplexed with each other. As will be appreciated by one of skill in the art, other combinations of antenna port sets and number of antennas in each antenna port set may also be possible.

In one aspect, some mapping techniques designed below may achieve orthogonality of transmission between different antenna ports, either in the FDM manner or in the CDM manner. For example, in some designs, code division multiplexed antenna ports, which share the same set of UE-RS REs 306 (e.g., U1 to U8 depicted in FIGS. 8 to 11), may be logically grouped as an antenna port set. In some mapping techniques, the antenna ports in the same antenna port set may use the same random sequence after mapping. In some designs, across different antenna port sets, different random sequences may be used.

Furthermore, in certain design techniques described below, repetition of the same random sequence over different PRBs may be avoided to alleviate any peak-to-average-power-ratio (PAPR) concerns.

In certain design techniques described below, the UE-RS mapping may be dependent on PRB locations of the assigned PDSCH, but the PRB index may be bandwidth agnostic, similar to the CRS mapping case. In one aspect, such designs may maintain orthogonality of UE-RS transmissions of multiple cells involved in serving one UE 120.

In addition, to avoid any potential confusion between CRS and UE-RS at a receiver, in one aspect, a different sequence may be used for UE-RS resource assignments.

In certain designs, a pseudo-random sequence generator may be initialized (e.g., at the beginning of each symbol) with $$c_{init} = f(N_{ID}^{ServingCell}, \lfloor n_s/2 \rfloor, l). \quad \text{Eq. (18)}$$

In Eq. (18), the following notation is used: $c_{init}$ is the initialized sequence, the function $f(\ )$ denotes a functional dependency, $N_{ID}^{ServingCell}$ is an identification of a service cell in which a UE 120 is operating, $n_s$ represents a slot number and l is the symbol index of the actual symbol locations of UE-RS (instead of the ordered UE-RS symbol occurrences). One example function in Eq. (18) may be:

$$c_{init} = 2^{16} \cdot (7 \cdot (n_s+1)+l+1) \cdot (2 \cdot N_{ID}^{ServingCell}+1) + C + 2 * N_{ID}^{ServingCell} \quad \text{Eq. (19)}$$

where C is a constant, e.g., such that $C+2*N_{ID}^{ServingCell}$ is no more than the largest possible UE RNTI value (0xFFFF). Alternatively, C=0 assignment may be used. Because Eq. (19) is independent of an antenna port set index parameter, all the antenna port sets may have the same initialized random sequence. The differentiation of different antenna port sets can be realized in an interleaved manner. For example, for four antenna port sets {0, 1, 2, 3}, the interleaved assignment may be performed as {0, 1, 2, 3, 0, 1, 2, 3, 0, 1, 2, 3, . . . }. Note that MaxNumAntPortSets may be assumed in constructing the interleaving structure. MaxNumAntPortSets is an interleaver design parameter, which does not have to correspond to the actual number of antenna port sets being used. MaxNumAntPortSets may be smaller or larger than the actual number of antenna port sets being used. For example, MaxNumAntPortSets=1 may be assumed, irrespective of the number of antenna port sets being used, in which case, the same random sequence values are used for every antenna port set; in other words, the antenna port sets are not differentiated by the random sequences. Other interleaving designs are possible. The eNB 110 and UEs 120 may share (either explicitly through signaling or implicitly) the interleaving option used.

The reference signal sequence $r_{l,n_s}(m)$ may be mapped to complex-valued modulation symbols $a_{k,l}^{(p)}$ used as UE-RS reference symbols for antenna port set p in slot $n_s$ according to $$a_{k,l}^{(p)} = r_{l,n_s}(m') \quad \text{Eq. (20)}$$

where k the frequency locations of the UE-RS, while l is the symbol index of the UE-RS, and, $$m' = \text{MaxNumAntPortSets} * (N(n_s) * n_{PRB} + N') + \text{AntPortSetIndex}$$

$$N' = 0, 1, \ldots, N(n_s) - 1 \quad \text{Eq. (21)}$$

where $N(n_s)$ is the number of UE-RS REs per RB per symbol, and could change over different symbols (e.g., see FIG. 11). AntPortSetIndex is the index of the antenna port set, and MaxNumAntPortSets is the max number of antenna port sets supported on a per UE basis, or on a per cell basis, or by specification (e.g., hardcoded by 4). $n_{PRB}$ is the bandwidth agnostic RB ID. For instance, it can be derived as:

$$n_{PRB} = 0, \ldots, N^{DL}_{RB} - 1 \quad \text{Eq. (22)}$$

$$n_{PRB} = n_{PRB} + N_{RB}^{max,DL} - \text{floor}(N^{DL}_{RB}/2) \quad \text{Eq. (23)}$$

The ceiling operation may also possible in Eq. (3).

Figure 12:
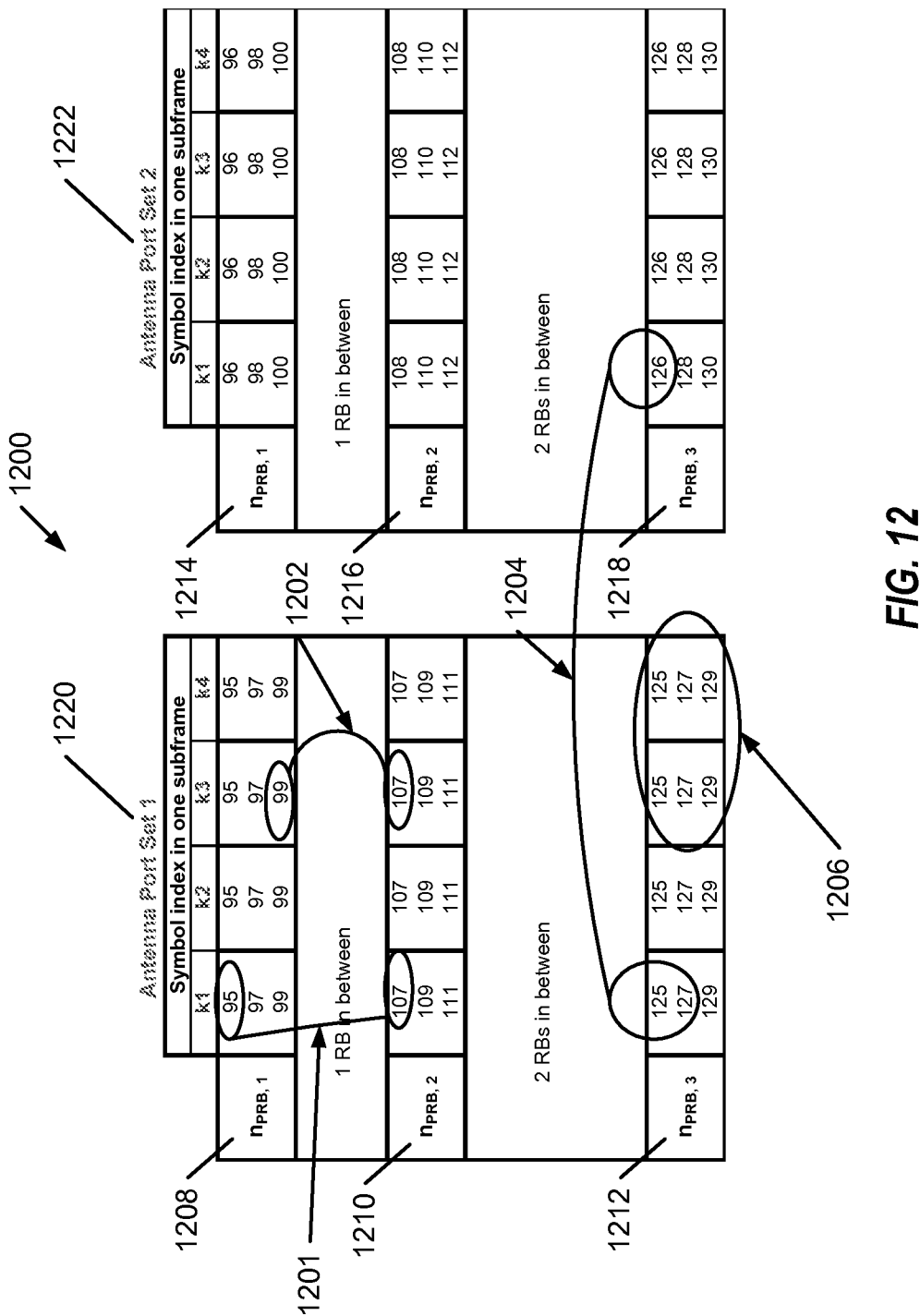
FIG. 12 illustrates an example resource allocation pattern for user equipment reference signal (UE-RS).

FIG. 12 depicts an example resource mapping 1200 generated according to Eqs. (18) to (22). The resource mapping 1200 shows mapping of transmission resources to antenna port set 1 (table 1220) and antenna port set 2 (table 1222) at symbol locations k1, k2, k3 and k4. Without loss of generality, it is assumed that bandwidth is assigned to the receiving UE 120 in three PRBs: $n_{PRB,1}$, $n_{PRB,2}$ and $n_{PRB,3}$, listed in rows 1208, 1210 and 1212 in table 1220 and rows 1214, 1216 and 1218 in table 1222, respectively. It is further assumed that the three PRBs are non-contiguous. It is further assumed that 3 REs per RB per symbol are assigned to UE-RS. In other words, a separation of 1 RB (or 2 RBs) in assignment may imply an offset of 12 (or 18), as shown by entries 1201. The following aspects of the resource mapping performed according to Eqs. (18) to (22) may be evident.

In one aspect, it may be noticed that the resource mapping 1200 is not contiguous across $n_{PRB}$s. For example, the entries in the circled area 1202 change from "99" at the end of $n_{PRB,1}$ (row 1208) to "107" at the beginning of the next PRB $n_{PRB,2}$ (row 1210). Similar non-contiguity may be noticed in other entries for both antenna port sets, e.g., 111 to 125 for antenna port set 1 in table 1220, and 100 to 108 and 112 to 106 for antenna port set 2 in table 1222.

In another aspect, it may be noticed that the resource mapping 1200 "interleaves" resource assignments for antenna port set 1 and antenna port set 2. For example, entries "125" and "127" of antenna port set 1, indicated by area 1204, interleave with the entry "126" in the corresponding symbol and $n_{PRB}$ for the antenna port set 2.

In another aspect, it may be noted that the same set of samples may be used across different symbols, for the same antenna port set. For example, area 1206 shows that the same offset values "125," "127" and "129" are used for symbols k3 and k4. This feature may be seen in all entries, for each symbol k1, k2, k3 and k4 and for each PRB.

In some designs, sequence initialization may be performed (instead of Eq. (18)), using the following Eq. (24), which uses the antenna port set index, $$c_{init} = f(N_{ID}^{ServingCell}, \lfloor n_s/2 \rfloor, l, \text{AntPortSetIndex}). \quad \text{Eq. (24)}$$

The function $f( )$ may be chosen to be:

$$c_{init} = 2^{16} \cdot (7 \cdot (n_s+1)+l+1) \cdot (2 \cdot N_{ID}^{ServingCell}+1) + \text{AntPortSetIndex} \cdot C_2 + 2 \cdot N_{ID}^{ServingCell} \quad \text{Eq. (25)}$$

where $C_2$ is such that $$\text{AntPortSetIndex} \cdot C_2 + 2 \cdot N_{ID}^{ServingCell} \quad \text{Eq. (26)}$$

is no more than 0xFFFF, even with the maximum number of antenna port sets (e.g., 4 for LTE-A), and the largest cell ID. It may be seen that because $c_{init}$ depends on the antenna port set index AntPortSetIndex, different antenna port sets may have different initializations.

Using the initialization as in Eqs. (24) to (26), the reference signal sequence $r_{l,n_s}(m)$ may then be mapped to complex-valued modulation symbols $a_{k,l}^{(p)}$ used as UE-RS reference symbols for antenna port set p in slot $n_s$ according to:

$$a_{k,l}^{(p)} = r_{l,n_s}(m'); \quad \text{Eq. (27)}$$

where k the frequency locations of the UE-RS, while l is the symbol indices of the UE-RS, and, $$m' = N(n_s) \cdot n_{PRB} + N'$$

$$N' = 0, 1, \ldots, N(n_s)-1 \quad \text{Eq. (28)}$$

where $N(n_s)$ is the number of UE-RS REs 306 per RB per symbol. It may be noted that the value $N(n_s)$ could change over different symbols (e.g., see, resource pattern 1100 depicted in FIG. 11), and $n_{PRB}$ may be the bandwidth agnostic RB ID.

Figure 13:
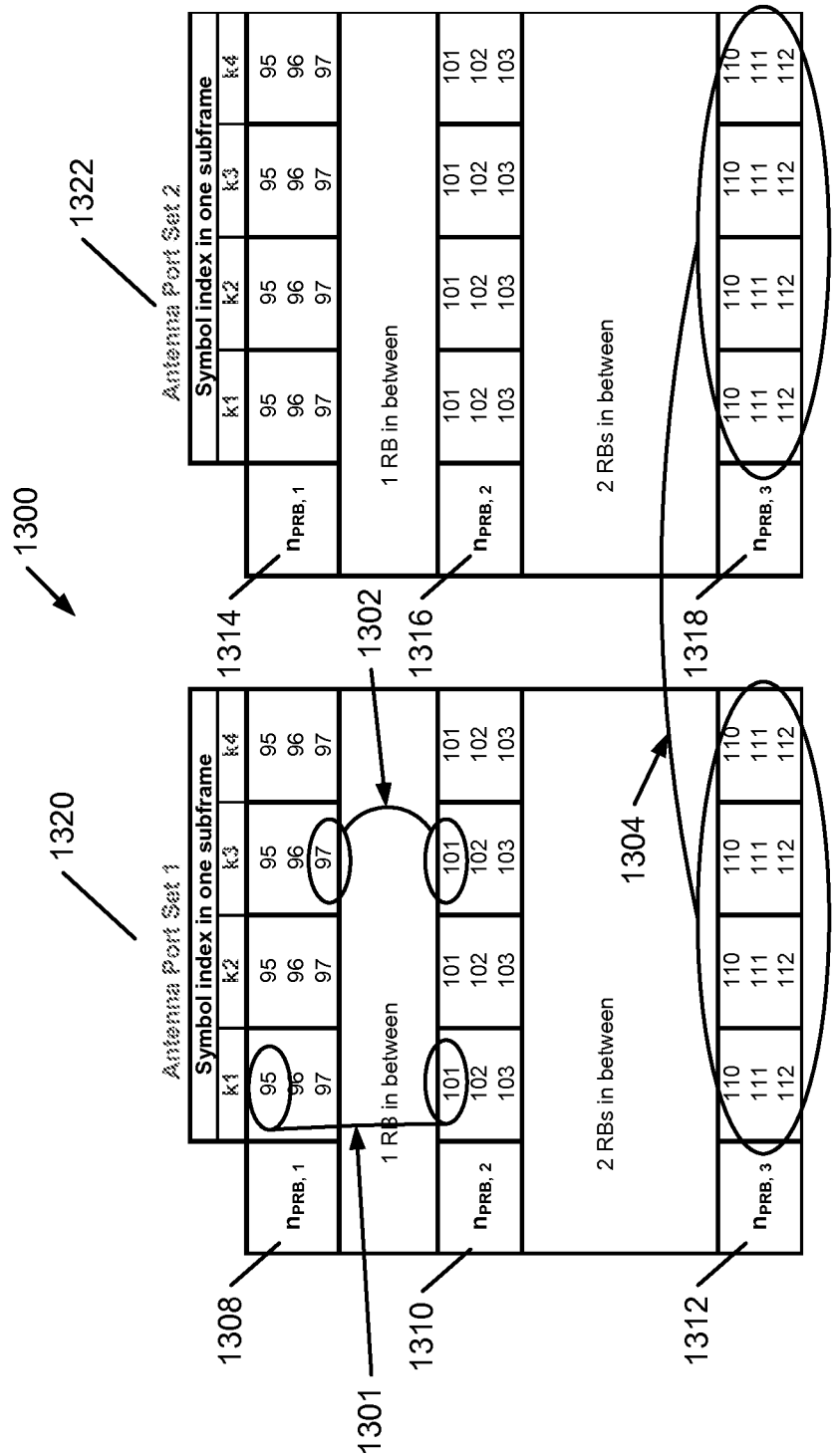
FIG. 13 illustrates yet another example resource allocation pattern for user equipment reference signal (UE-RS).

FIG. 13 depicts an example resource mapping 1300 generated according to Eqs. (24) to (28). The resource mapping 1300 may be similar to the resource mapping 1200 depicted in FIG. 12 in certain aspects. Table 1320 may correspond to antenna port set 1 and table 1322 may correspond to antenna port set 2. As in the case of resource mapping 1200, it is assumed that bandwidth is assigned to the receiving UE 120 in three PRBs: $n_{PRB,1}$, $n_{PRB,2}$ and $n_{PRB,3}$, listed in rows 1308, 1310 and 1312 in table 1320 and rows 1314, 1316 and 1318 in table 1322, respectively. It is further assumed that the three PRBs are non-contiguous. It is further assumed that 3 REs per RB per symbol are assigned to UE-RS. Furthermore, the resources are assumed to be assigned to two antenna port sets at symbol locations k1, k2, k3 and k4.

The resource mapping 1300 may be seen to be different from the resource mapping 1200 as follows. Because a bandwidth agnostic PRB index may be used to derive offsets (see, e.g., Eq. (28) where $n_{PRB}$ is bandwidth agnostic), a separation of 1 RB (or 2 RBs) between $n_{PRB}$s, e.g., as shown in area 1301, results in an offset of 6 (or 9) RBs, e.g., between corresponding entries in rows 1308 and 1310. Furthermore, while different initializations may be used at the beginning of each symbol (see, e.g., Eq. (24)), the same offsets may be used in the same $n_{PRB}$ for each symbol across the antenna port sets, as illustrated by entries 1304, corresponding to row 1312 of table 1320 and row 1318 of table 1322, which may be identical for each symbol k1, k2, k3, k4 in each antenna port set (tables 1320 and 1320).

The resource mapping 1300 may be seen to achieve certain characteristics also seen in the resource mapping 1200. For example, the resource mapping 1300 may not be contiguous across $n_{PRB}$s (e.g., as seen by entries 1302). Furthermore, because antenna port set index dependent and symbol dependent initializations are used for the resource mapping 1300, it will be appreciated that the fixed offsets for each symbols may still result in non-contiguous, randomized allocation of transmission resources to UE-RS, as in the case of the resource mapping 1200.

FIG. 14 is a flow chart representation of a process 1400 of wireless communication. In some designs, the process 1400 may be implemented at the eNB 110. At block 1402, one or more antenna port sets may be formed. An antenna port set may comprise a logical group of two or more antenna ports. An antenna port set index may be assigned to a group of antennas of an antenna port set. In some designs, the decision to assign antenna port indices may be performed by the eNB 110 and communicated to UEs 120. In some designs, antenna port set assignments may be decided a priori and may be known to both the eNB 110 and UEs 120. At block 1404, transmission resources are allocated to a UE-RS based at least in part on an antenna port set index. In some designs, the allocation may be a function of the antenna port set index. The allocation of transmission resources may be performed using various possible design alternatives discussed herein. For example, in some designs, the mapping, as disclosed in Eq. (18) to Eq. (23) may be used. The resulting resource mapping may be similar in aspects to the resource mapping 1200, discussed with respect to FIG. 12. In some designs, the mapping, as disclosed in Eq. (24) to Eq. (28) may be used. The resulting resource mapping may be similar in aspects to the resource mapping 1300, discussed with respect to FIG. 13.

FIG. 15 is a block diagram representation of an apparatus 1500 for wireless communication. The apparatus 1500 may, for example, be implemented at an eNB 110. The apparatus 1500 comprises a module 1502 for forming one or more antenna port sets. An antenna port set may comprise a logical group of two or more antenna ports. An antenna port set index may be assigned to a group of antennas of an antenna port set. The module 1502 may assign an antenna port index as discussed with respect to the operation 1402. The apparatus 1500 may comprise a module 1504 for allocating transmission resources to a user equipment reference signal based at least in part on an antenna port set index. In some designs, the allocation may be a function of the antenna port set index. The module 1504 may implement operation 1404 according to various design options discussed herein.

Figures 16, 17:
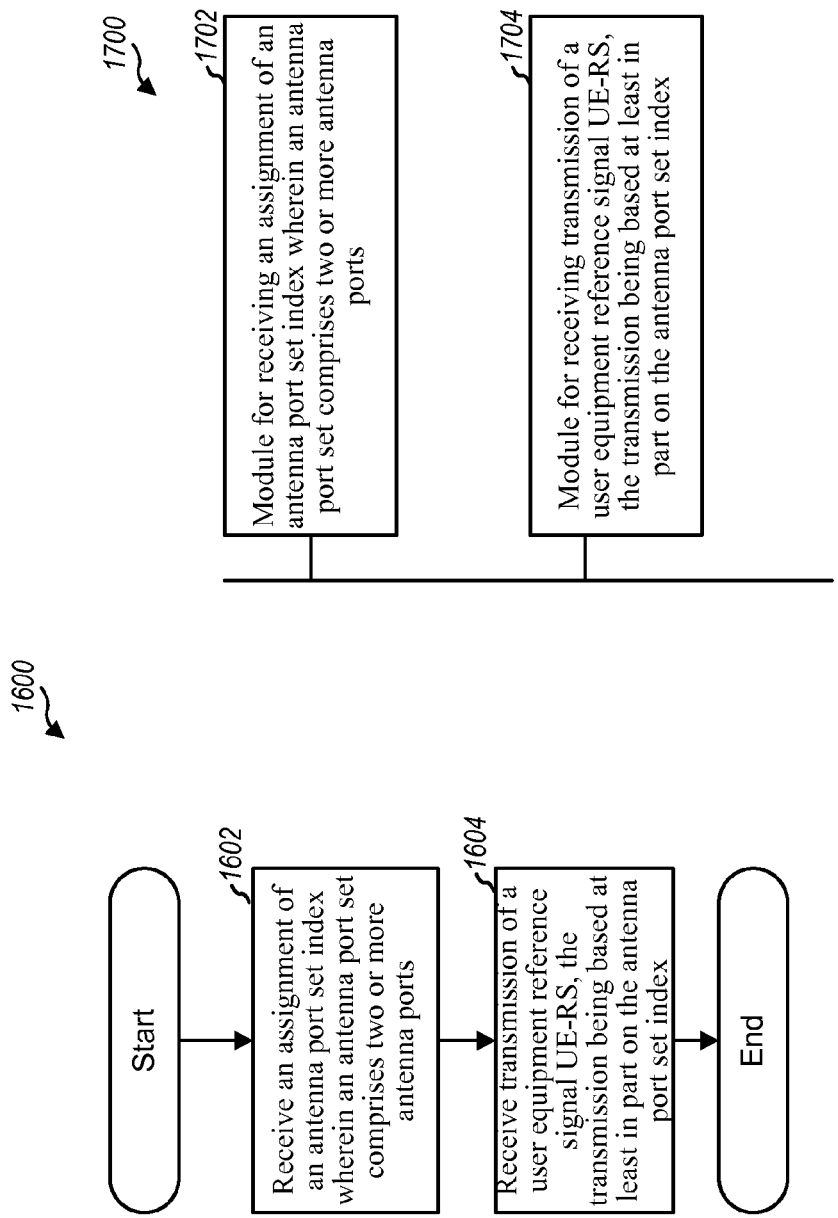
FIG. 16 illustrates a flow chart representation of a process of wireless communication.
FIG. 17 illustrates a block diagram representation of an apparatus for wireless communication.

FIG. 16 is a flow chart representation of a process 1600 of wireless communication. The process 1600 may be implemented at, for example, a UE 120. At block 1602, an assignment of an antenna port index may be received. An antenna port set may comprise a logical group of two or more antenna ports. In some designs, the assignment may be received as a message from the eNB 110. In some designs, the UE 120 may receive additional parameters, such as MaxNumAntPortSets, which may be used by the UE 120 in calculation of UE-RS assignments. In some designs, these parameters, such as MaxNumAntPortSets and the antenna port set index may be known to the UE 120 a priori, such as, for example, a boot option. At block 1604, a transmission of a UE-RS may be received. The transmission of the UE-RS may be based at least in part on the antenna port set index. In some designs, the transmission may be a function of the antenna port set index. The UE-RS may be received in accordance with one or more of several design options discussed herein. In some designs, the UE 120 may initialize a sequence and compute UE-RS resource locations by computing consistent with the design options disclosed herein. Subsequent to receiving a UE-RS transmission, the UE 120 may analyze the received signal and send a report to the eNB 110 based on the analysis.

FIG. 17 is a block diagram representation of an apparatus 1700 for wireless communication. The apparatus 1700 may, for example, be implemented at a UE 120. The apparatus 1700 comprises a module 1702 for receiving an assignment of an antenna port index. An antenna port set may comprise a logical group of two or more antenna ports. The module 1702 may receive the assignment of the antenna port index as discussed with respect to the operation 1602. The apparatus 1700 may further comprise a module 1704 for receiving transmission of a user equipment reference signal (UE-RS). The transmission may be based at least in part on the antenna port set index. In some designs, the transmission may be a function of the antenna port set index. The module 1704 may implement operation 1604 according to various design options discussed herein.

It will be appreciated that various techniques for mapping transmission resources to UE-RS transmissions are disclosed. Some disclosed techniques include initializing a random sequence at the beginning of a symbol and calculating a fixed offset to physical resources (e.g., REs 306) to assign to UE-RS transmissions. Some disclosed techniques include initializing a fixed sequence at the beginning of a symbol, and calculating a random offset to physical resources to assign to UE-RS transmissions. The disclosed mappings may achieve frequency and/or code division orthogonalization between signals transmitted from antenna ports in an antenna port set. It may further be appreciated that, in some designs, sequence initialization and mapping may be performed at UEs 120. In one aspect, local calculations of UE-RS transmission locations may assist the UE 120, in receiving UE-RS transmissions without a need to receive explicit UE-RS location information from the eNB 110.

It will further be appreciated that the disclosed techniques may result in a density of UE-RS mapping, which may change between slots containing UE-RS.

It will further be appreciated that the disclosed techniques may result in a mapping in which locations of UE-RS resources may depend on antenna port set indices. In one aspect, UE-RS mapping may depend on a CP type for a subframe. In another aspect, UE-RS mapping may depend on a type of sub-frame (e.g., normal CP, DwPTS, relaying backhaul subframe, etc.).

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The word "exemplary" is used herein to mean serving as an example, instance, or illustration. Any aspect or design described herein as "exemplary" is not necessarily to be construed as preferred or advantageous over other aspects or designs.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

In view of the exemplary systems described supra, methodologies that may be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described herein. Additionally, it should be further appreciated that the methodologies disclosed herein are capable of being stored on an article of manufacture to facilitate transporting and transferring such methodologies to computers. The term article of manufacture, as used herein, is intended to encompass a computer program accessible from any computer-readable device, carrier, or media.

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein, will only be incorporated to the extent that no conflict arises between that incorporated material and the existing disclosure material.

What is claimed is:

1. A wireless communication method implemented in a multi-input multi-output MIMO system, the system comprising:
   forming an antenna port set, wherein the antenna port set comprises a plurality of antenna ports that share a set of transmission resources;
   assigning an antenna port set index to a group of antennas of the plurality of antenna ports in the antenna port set;
   allocating transmission resources to a user equipment reference signal (UE-RS), the allocating being based at least in part on the antenna port set index, the allocating comprising mapping the UE-RS to the transmission resources, the mapping being a function of the antenna port set index, the UE-RS being scrambled using a pseudorandom UE-RS sequence, and the pseudo-random UE-RS sequence being initialized using an initialization sequence based at least in part on initializing the pseudo-random UE-RS sequence independent of the antenna port set index; and
   transmitting, by a base station, the UE-RS from the antenna ports in the antenna port set.

2. The method of claim 1, wherein the UE-RS transmissions from the antenna ports in the antenna port set are frequency domain orthogonally multiplexed.

3. The method of claim 1, wherein the UE-RS transmissions from the antenna ports in the antenna port set are code domain orthogonally multiplexed.

4. The method of claim 1, wherein the MIMO system comprises eight antenna ports; and
   wherein the forming comprises one of:
      forming four antenna port sets, each antenna port set comprising a pair of antenna ports, and
      forming two antenna port sets, each antenna port set comprising four antenna ports.

5. The method of claim 1, wherein the initializing the pseudo-random UE-RS sequence further comprises initializing the pseudo-random UE-RS sequence using an identification of a serving cell in which the UE-RS is to be transmitted.

6. The method of claim 1, wherein the initializing the pseudo-random UE-RS sequence further comprises initializing the pseudo-random UE-RS sequence using a symbol location index of a symbol in which the UE-RS is to be transmitted.

7. The method of claim 6, wherein the allocated transmission resources are discontiguous across different symbols.

8. The method of claim 1, wherein the mapping is further based at least in part on one or more of a slot number in which the UE-RS is to be transmitted, a physical resource block index, a maximum number of antenna port sets supported by a user equipment receiving the UE-RS transmissions, or a combination thereof.

9. The method of claim 8, wherein the mapping is independent of a bandwidth assigned to a shared data channel over which the UE-RS is to be transmitted.

10. The method of claim 8, wherein the mapping produces at least two different physical resource assignments for two different physical resource block indices.

11. The method of claim 1, wherein the pseudo-random UE-RS sequence is different from an initialization sequence used for allocation of common reference signal transmissions.

12. The method of claim 1, wherein the mapping comprises mapping using $$a_{k,l}^{(p)} = r_{l,n_s}(m'),$$

wherein $a_{k,l}^{(p)}$ represent complex-valued modulation symbols corresponding to the transmission resources, $r_{l,n_s}(m)$ represents the pseudo-random UE-RS sequence, $n_s$ is a slot number and l is an index of a symbol in which the UE-RS is to be transmitted, and m' is calculated using:

$$m' = \text{MaxNumAntPortSets} * (N(n_s) * n_{PRB} + N') + \text{AntPortSetsIndex}$$

$$N' = 0, 1, \ldots, N(n_s) - 1$$

wherein MaxNumAntPortSets is a system parameter, $N(n_s)$ is a number of resource elements assigned to the UE-RS transmission per resource block per symbol, $n_{PRB}$ is an identity of a physical resource block, AntPortSetsIndex is the antenna port set index and N' is a variable.

13. The method of claim 1, wherein the initializing the pseudo-random UE-RS sequence comprises initializing using:

$$c_{init} = 2^{16} \cdot (7 \cdot (n_s+1) + l + 1) \cdot (2 \cdot N_{ID}^{ServingCell} + 1) + C + 2 * N_{ID}^{ServingCell};$$

wherein $c_{init}$ is the pseudo-random UE-RS sequence, $n_s$ is a slot is a slot number and l is an index of a symbol in which the UE-RS is to be transmitted, $N_{ID}^{ServingCell}$ is an identification of a serving cell, and C is a constant.

14. A wireless communication method implemented in a multi-input multi-output MIMO system, the method comprising:
receiving an assignment of an antenna port set index associated with a group of antennas of a plurality of antenna ports of an antenna port set, wherein the plurality of antenna ports share a set of transmission resources; and
receiving, by a user equipment (UE), a transmission of a user equipment reference signal (UE-RS), the transmission of the UE-RS being based at least in part on the antenna port set index, the UE-RS being mapped to the transmission resources as a function of the antenna port set index, the UE-RS being scrambled using a pseudo-random UE-RS sequence, and the pseudo-random UE-RS sequence being initialized using an initialization sequence based at least in part on an initialization of the pseudo-random UE-RS sequence independent of the antenna port set index.

15. The method of claim 14, wherein transmissions from the plurality of antenna ports in the antenna port set are:
frequency domain multiplexed orthogonally; or
code division multiplexed orthogonally.

16. The method of claim 14, wherein initializing the pseudo-random UE-RS sequence further comprises initializing the pseudo-random UE-RS sequence using an identification of a serving cell in which the UE-RS is to be transmitted.

17. A non-transitory computer-readable storage medium having program code recorded thereon, the program code comprising:
program code to receive an assignment of an antenna port set index associated with a group of antennas of a plurality of antenna ports of an antenna port set, wherein the plurality of antenna ports share a set of transmission resources; and
program code to receive a transmission of a user equipment reference signal (UE-RS), the transmission being based at least in part on the antenna port set index, the UE-RS being mapped to the transmission resources as a function of the antenna port set index, the UE-RS being scrambled using a pseudo-random UE-RS sequence, and the pseudo-random UE-RS sequence initialized using an initialization sequence based at least in part on an initialization of the pseudo-random UE-RS sequence independent of the antenna port set index.

18. A wireless communication apparatus for use in a multi-input multi-output MIMO system, the apparatus comprising:
a memory unit; and
at least one processor coupled to the memory unit, the at least one processor being configured:
to receive an assignment of an antenna port set index associated with a group of antennas of a plurality of antenna ports of an antenna port set, wherein the plurality of antenna ports share a set of transmission resources; and
to receive a transmission of a user equipment reference signal (UE-RS), the transmission being based at least in part on the antenna port set index, the UE-RS being mapped to the transmission resources as a function of the antenna port set index, the UE-RS being scrambled using the pseudo-random UE-RS sequence, and the pseudo-random UE-RS sequence being initialized using an initialization sequence based at least in part on an initialization of the pseudo-random UE-RS sequence independent of the antenna port set index.

19. A wireless communication method implemented in a multi-input multi-output MIMO system, the system comprising:
forming an antenna port set, wherein the antenna port set comprises a plurality of antenna ports that share a set of transmission resources;
assigning an antenna port set index to the plurality of antenna ports in the antenna port set;
allocating transmission resources to a user equipment reference signal (UE-RS), the allocating being based at least in part on the antenna port set index, wherein the UE-RS is scrambled using a predetermined pseudo-random UE-RS sequence, the pseudo-random UE-RS sequence initialized using an initialization sequence; and
initializing the pseudo-random UE-RS sequence that is independent of the antenna port set index, wherein the initializing the pseudo-random UE-RS sequence comprises initializing using:

$$c_{init} = 2^{16} \cdot (7 \cdot (n_s+1) + l + 1) \cdot (2 \cdot N_{ID}^{ServingCell} + 1) + C + 2 * N_{ID}^{ServingCell};$$

in which $c_{init}$ is the pseudo-random UE-RS sequence, $n_s$ is a slot number and l is an index of a symbol in which the UE-RS is to be transmitted, $N_{ID}^{ServingCell}$ is an identification of a serving cell, and C is a constant; and
transmitting the UE-RS from the antenna ports in the antenna port set.

* * * * *